United States Patent
Hamasaki et al.

(10) Patent No.: US 11,249,179 B2
(45) Date of Patent: Feb. 15, 2022

(54) MOTION DETECTION SYSTEM AND MOTION DETECTION DEVICE

(71) Applicant: SOCIONEXT INC., Kanagawa (JP)

(72) Inventors: Kiichi Hamasaki, Yokohama (JP); Masato Suzuki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 15 days.

(21) Appl. No.: 16/939,884

(22) Filed: Jul. 27, 2020

(65) Prior Publication Data

US 2021/0033719 A1 Feb. 4, 2021

(30) Foreign Application Priority Data

Aug. 1, 2019 (JP) .............................. JP2019-142371

(51) Int. Cl.
*G01S 13/62* (2006.01)
*G01S 13/87* (2006.01)

(52) U.S. Cl.
CPC ............ *G01S 13/62* (2013.01); *G01S 13/872* (2013.01)

(58) Field of Classification Search
CPC ......... G01S 13/00; G01S 13/62; G01S 13/872
See application file for complete search history.

(56) References Cited

U.S. PATENT DOCUMENTS

| 9,575,560 B2 | 2/2017 | Poupyrev et al. |
| 9,811,164 B2 | 11/2017 | Poupyrev |
| 10,088,908 B1 | 10/2018 | Poupyrev et al. |
| 2005/0024258 A1* | 2/2005 | Matsuoka ............... G01S 7/411 342/70 |
| 2010/0289690 A1* | 11/2010 | Dai ........................... G01S 7/22 342/41 |
| 2013/0320865 A1* | 12/2013 | Murakami ............. G01S 13/56 315/158 |
| 2015/0263808 A1* | 9/2015 | Kondo .................. H04B 10/116 398/115 |
| 2015/0346820 A1 | 12/2015 | Poupyrev et al. |
| 2016/0320852 A1 | 11/2016 | Poupyrev |
| 2016/0349845 A1 | 12/2016 | Poupyrev et al. |
| 2018/0004301 A1 | 1/2018 | Poupyrev |
| 2018/0341333 A1 | 11/2018 | Molchanov et al. |

FOREIGN PATENT DOCUMENTS

| JP | 2017-517062 A | 6/2017 |
| JP | 2018-520394 A | 7/2018 |

* cited by examiner

*Primary Examiner* — Hugo Molina
(74) *Attorney, Agent, or Firm* — McDermott Will and Emery LLP

(57) ABSTRACT

A motion detection system includes a first motion detection device that detects a motion of an object based on a reflected wave of a radio wave transmitted by a first radio wave sensor, the first motion detection device including the first radio wave sensor, and a second motion detection device that detects the motion based on a reflected wave of a radio wave transmitted by a second radio wave sensor, the second motion detection device including the second radio wave sensor, wherein one motion detection device among the first and second motion detection devices transmits a determination radio wave and another motion detection device among the first and second motion detection devices receives the determination radio wave, and wherein only the first motion detection device is used to detect the motion when received intensity of the received determination radio wave is smaller than a predetermined threshold.

13 Claims, 30 Drawing Sheets

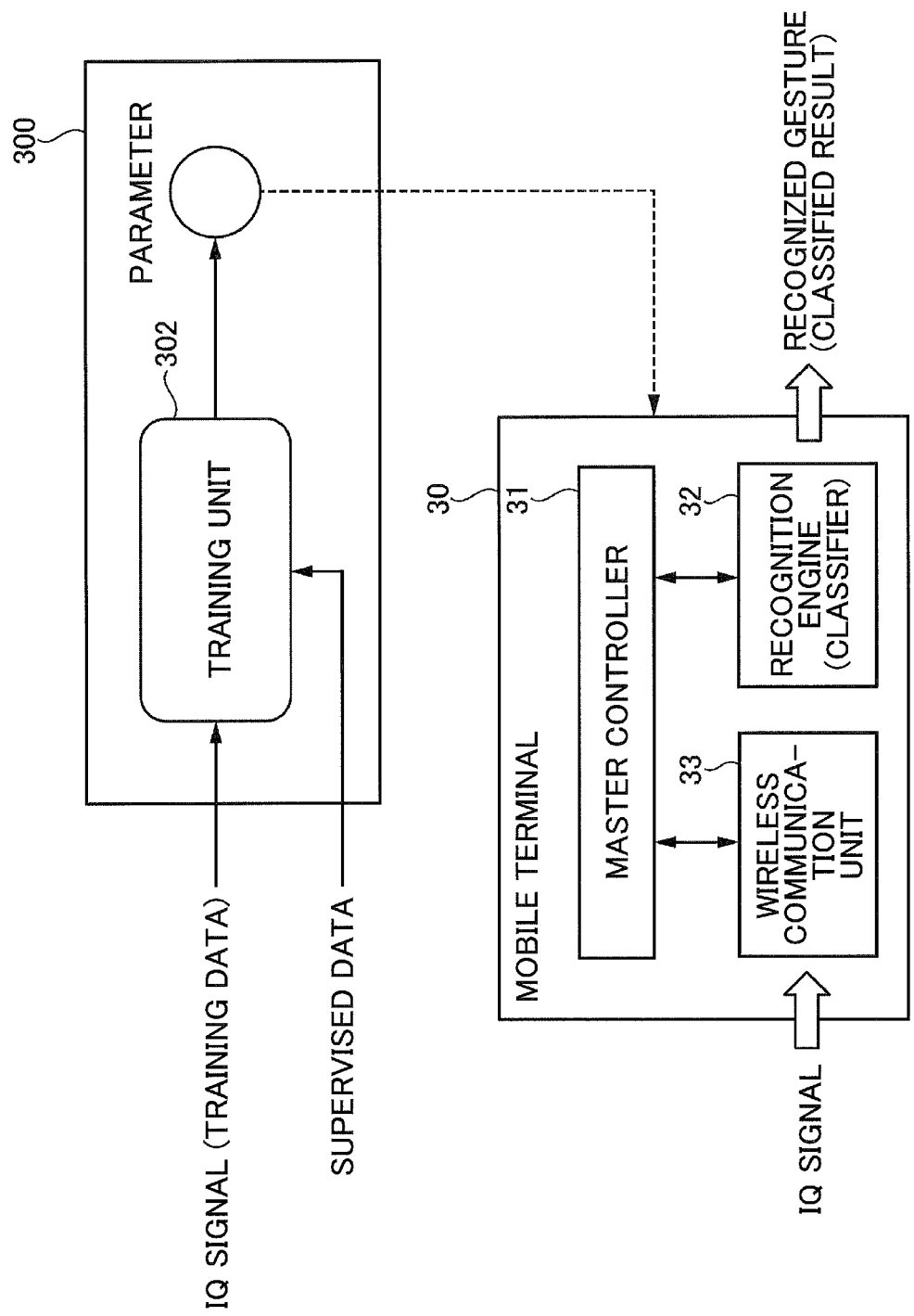

MOTION DETECTION SYSTEM AND MOTION DETECTION DEVICE

CROSS-REFERENCE TO RELATED APPLICATIONS

The present application is based upon and claims the benefit of priority from the prior Japanese Patent Application No. 2019-142371 filed on Aug. 1, 2019, with the Japanese Patent Office, the entire contents of which are incorporated herein by reference.

FIELD

The present disclosure relates to a motion detection system and a motion detection device.

BACKGROUND

A device operated by computer control includes a keyboard or a touch panel for inputting instructions. For example, smartphones and watch-type wearable devices may have difficulty in inputting many instructions and complex instructions because the touch panel, which is also used as a screen, is small. Thus, a method of recognizing motions of the hands and fingers as an instruction to the device by using a wearable gesture recognition device that irradiates a radio wave, has been proposed. Also, when multiple gesture recognition devices are used, the number of gestures that can be recognized increases, the recognition rate is improved, or complex gestures can be recognized.

RELATED-ART DOCUMENTS

Patent Document

[Patent Document 1] Japanese National Publication of International Patent Application No. 2018-520394
[Patent Document 2] U.S. Patent Application Publication No. 2016/0349845
[Patent Document 3] U.S. Patent Application Publication No. 2018/0341333
[Patent Document 4] U.S. Patent Application Publication No. 2018/0004301
[Patent Document 5] U.S. Pat. No. 9,811,164
[Patent Document 6] U.S. Pat. No. 9,575,560
[Patent Document 7] U.S. patent Ser. No. 10/088,908
[Patent Document 8] Japanese National Publication of International Patent Application No. 2017-517062

SUMMARY

According to an aspect of the embodiment, a motion detection system includes a first motion detection device configured to detect a motion of an object based on a reflected wave of a radio wave transmitted by a first radio wave sensor, the first motion detection device including the first radio wave sensor, and a second motion detection device configured to detect the motion of the object based on a reflected wave of a radio wave transmitted by a second radio wave sensor, the second motion detection device including the second radio wave sensor, wherein one motion detection device among the first motion detection device and the second motion detection device transmits a determination radio wave and another motion detection device among the first motion detection device and the second motion detection device receives the determination radio wave, and wherein only the first motion detection device is used to detect the motion of the object when received intensity of the received determination radio wave is smaller than a predetermined threshold.

BRIEF DESCRIPTION OF THE DRAWINGS

FIG. 30 is an explanatory drawing illustrating an example of a method of causing a recognition engine to function as a classifier by machine learning in a fifth embodiment.

DESCRIPTION OF EMBODIMENTS

Multiple gesture recognition devices that recognize a gesture of a hand or a finger may be attached to an arm, a wrist, or the like that can radiate a radio wave to the hand or the finger, for example, but depending on the position or the angle of the arm, the radio wave may be radiated in a direction unrelated to the hand or finger that gestures. The gesture recognition device that irradiates the radio wave in the unrelated direction does not contribute to the gesture recognition and consumes wasteful electric power. However, no method has been proposed for controlling an operation of each gesture recognition device in accordance with a direction of the radio wave radiated by each of the multiple gesture recognition devices.

According to the disclosed technique, the power consumption of the motion detection system including multiple motion detection devices can be suppressed.

In the following, embodiments will be described with reference to the drawings.

First Embodiment

Figure 1:
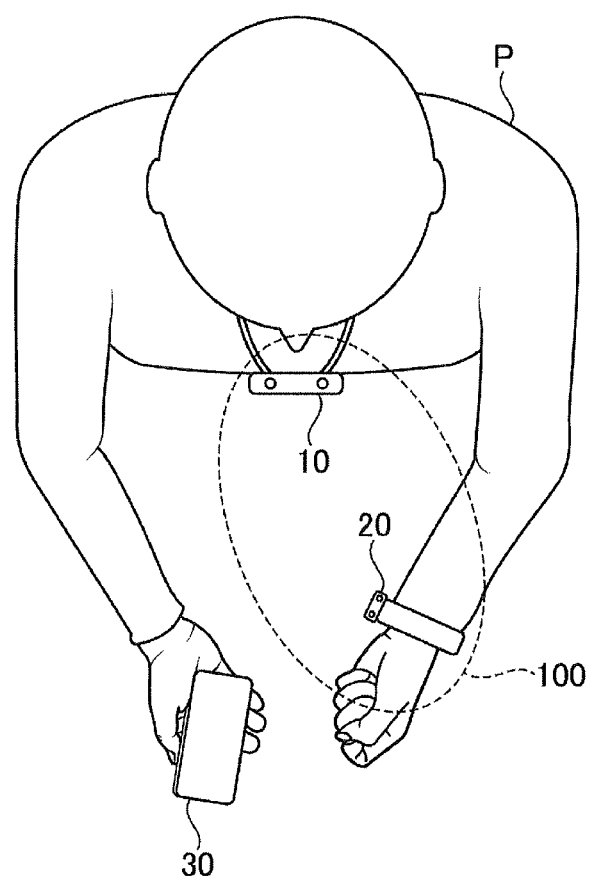
FIG. 1 is an explanatory drawing illustrating an overview of a motion detection system according to a first embodiment.

FIG. 1 illustrates an overview of a motion detection system 100 according to a first embodiment. The motion detection system 100 includes, for example, a radar module 10 hung at a chest of a person P, a radar module 20 attached to a left wrist of the person P, and an information processing terminal, such as a mobile terminal 30. For example, the radar module 20 may be a wristwatch type module attached to a wrist. The radar modules 10 and 20 are examples of motion detection devices for detecting a motion of an object.

For example, an object to be detected is an index finger of a right hand and a motion to be detected is a gesture of the index finger. The object to be detected and the motion to be detected are not limited to the above-described object and motion.

Figure 2:
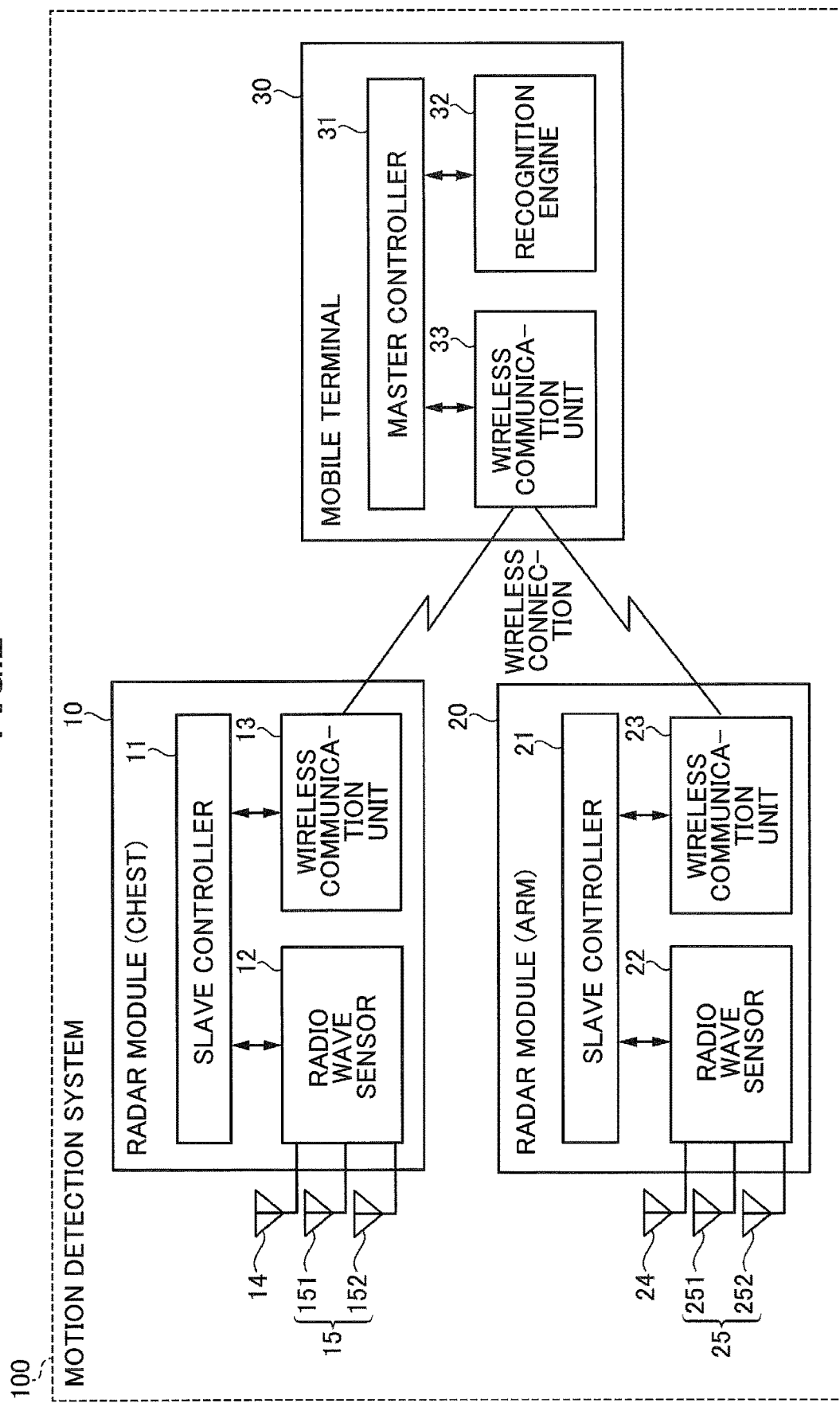
FIG. 2 is a block diagram illustrating a configuration example of the motion detection system of FIG. 1.

Two circles horizontally aligned in a shoulder width direction of the person P in the radar module 10 illustrate an arrangement example of receiving antennas 151 and 152 illustrated in FIG. 2. Similarly, two circles aligned in a longitudinal direction of a left forearm in the radar module 20 illustrate an arrangement example of receiving antennas 251 and 252 illustrated in FIG. 2.

The radar module 10 may be attached to a stomach. The radar module 20 may be attached to a right wrist, a left forearm, or a right forearm. The attachment positions of the radar modules 10 and 20 are not limited to the above-described positions and may be attached to another part. When the radar module 20 is attached to the right hand, for example, a gesture of the left index finger may be detected. Furthermore, a gesture of multiple fingers, a gesture of changing a direction of a palm, or a gesture of changing an angle of the wrist or the forearm may be detected. Additionally, in order to detect the gesture, a radar module other than the radar modules 10 and 20 may be attached to the person P, and a radar module may be attached to a shoe, a hat, or the like that are worn by person P.

FIG. 2 illustrates a configuration example of the motion detection system 100 of FIG. 1. The radar module 10 arranged at the chest includes a slave controller 11, a radio wave sensor 12, a wireless communication unit 13, a transmitting antenna 14, and a receiving antenna 15. The multiple receiving antennas 15 may be provided, and for example, two receiving antennas 151 and 152 may be provided as illustrated in FIG. 2. The number of the receiving antennas 15 may be three or more. The radar module 20 attached to the wrist includes a slave controller 21, a radio wave sensor 22, a wireless communication unit 23, a transmitting antenna 24, and a receiving antenna 25. The multiple receiving antennas 25 may be provided, and for example, two receiving antennas 251 and 252 may be provided as illustrated in FIG. 2. The number of the receiving antennas 25 may be three or more.

The mobile terminal 30 includes a master controller 31, a recognition engine 32, and a wireless communication unit 33. The recognition engine 32 is an example of a recognition unit that recognizes a motion of an object. The wireless communication units 13, 23, and 33 are connected by a wireless local area network (LAN), Bluetooth (registered trademark), or the like, but may be connected by another wireless standard.

For example, the radar modules 10 and 20 and the mobile terminal 30 may include a memory for storing data and a control program, and a battery. The radar modules 10 and 20 and the mobile terminal 30 that are operated by the battery preferably consume less power in order to increase operating time.

The slave controller 11 is a logic circuit, such as a processor, such as a CPU, or a sequencer, and controls an entire operation of the radar module 10. For example, the slave controller 11 causes the radio wave sensor 12 to transmit and receive a radio wave, and controls the wireless communication unit 13 to transmit data indicating the received radio wave to the mobile terminal 30. The wireless communication unit 13 wirelessly communicates with the wireless communication unit 33 of the mobile terminal 30.

The radio wave sensor 12, for example, transmits a radio wave for detecting a motion from the transmitting antenna 14 and receives a reflected wave of the transmitted radio wave by the receiving antennas 151 and 152 based on an instruction from the slave controller 11. The radio wave sensor 12 detects the speed, distance, azimuth angle, and elevation angle of an object reflecting the transmitted radio wave, such as a finger, with respect to the radio wave sensor 12, based on the transmitted radio wave and the received reflected wave. Here, the azimuth angle is an angle of a direction parallel to the alignment direction of the receiving antennas 151 and 152, and the elevation angle is an angle of a direction orthogonal to the alignment direction of the receiving antennas 151 and 152. The radio wave sensor 12 may transmit a determination radio wave to the radar module 20 based on an instruction from the slave controller 11 or may receive a determination radio wave from the radar module 20.

The slave controller 21 is a logic circuit, such as a processor, such as a CPU, or a sequencer, and controls an entire operation of the radar module 20. For example, the slave controller 21 causes the radio wave sensor 22 to transmit and receive a radio wave, and controls the wireless communication unit 23 to transmit data indicating the received radio wave to the mobile terminal 30. The wireless communication unit 23 wirelessly communicates with the wireless communication unit 33 of the mobile terminal 30.

The radio wave sensor 22, for example, transmits a radio wave for detecting a motion from the transmitting antenna 24 and receives a reflected wave of the transmitted radio wave by the receiving antennas 251 and 252 based on an instruction from the slave controller 21. The radio wave sensor 22 detects the speed, distance, azimuth angle, and elevation angle of an object reflecting the transmitted radio wave, such as the finger, with respect to the radio wave sensor 22 based on the transmitted radio wave and the received reflected wave. Here, the radio wave sensor 22 may transmit a determination radio wave to the radar module 10 based on an instruction from the slave controller 21 or may receive a determination radio wave from the radar module 10.

Here, the determination radio wave is transmitted and received to determine whether the radar module 20 is at a position where a motion of an object, such as the finger performing a gesture, can be detected. In other words, the determination radio wave is used to determine whether an object such as the finger performing a gesture is irradiated with the radio wave transmitted by the radio wave sensor 12 of the radar module 20.

The mobile terminal 30 is, for example, a smartphone or a tablet terminal. The mobile terminal may be a game console. The master controller 31 is a processor, such as a CPU mounted in the mobile terminal 30, and controls an entire operation of the mobile terminal 30. For example, the master controller 31 receives data for recognizing the gesture from one or both of the radar modules 10 and 20 through the wireless communication unit 33. The master controller 31 transfers the received data to the recognition engine 32. The motion detection system 100 may include a stationary terminal including the master controller 31, the recognition engine 32, and the wireless communication unit 33 instead of the mobile terminal 30.

Figure 16:
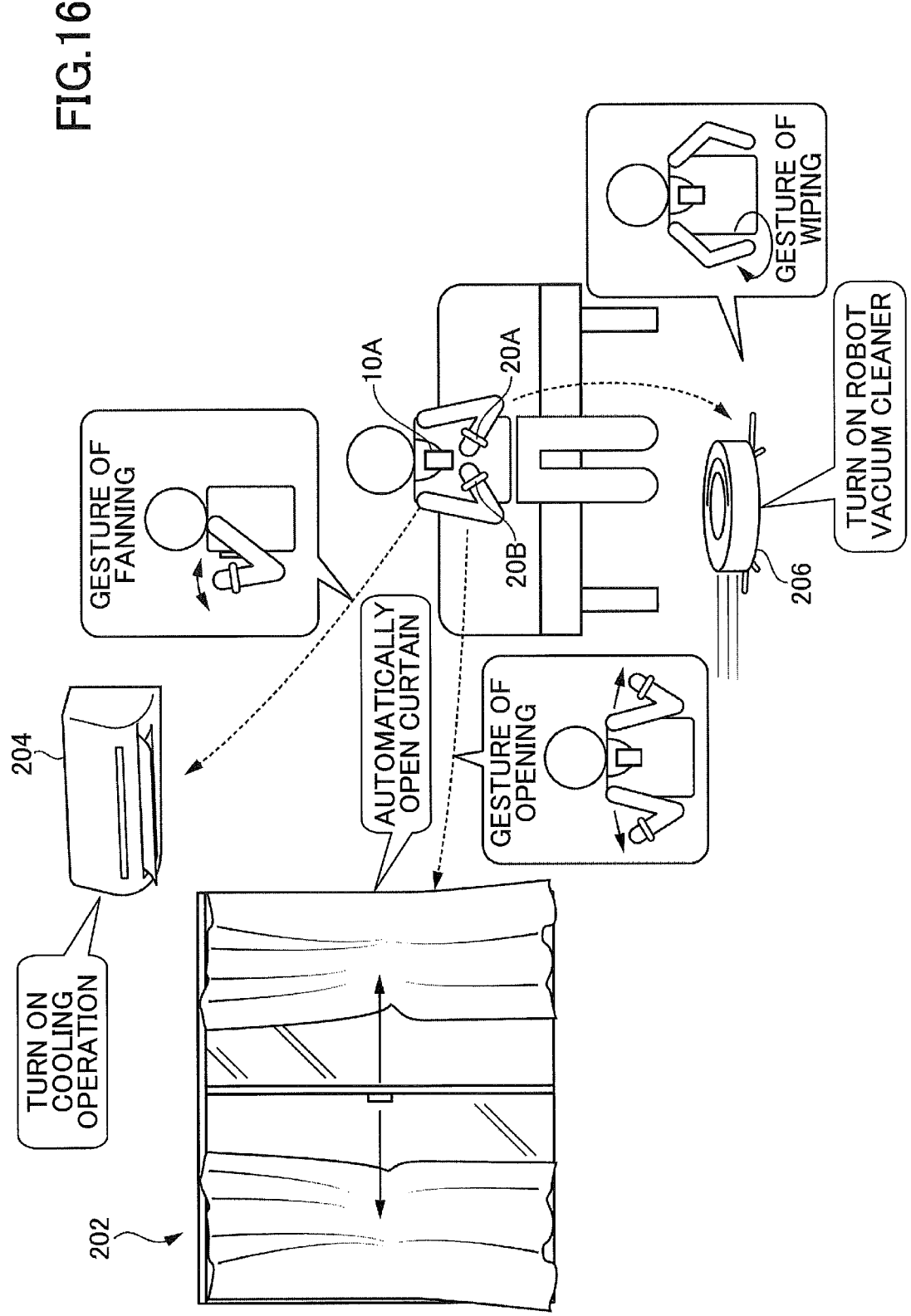
FIG. 16 is an explanatory drawing illustrating an example of operating a device and so on in a room based on a gesture recognized by the motion detection system of FIG. 15.

The recognition engine 32 recognizes a gesture based on the data transferred from the master controller and notifies the master controller 31 of the recognized gesture. The master controller 31 instructs a device or the like (which is not illustrated) to operate, based on the gesture recognized by the recognition engine 32. An example of the device operated based on the gesture is illustrated in FIG. 16. When the mobile terminal 30 is a game console, the screen of a game being executed is changed or progress of a game is changed based on the gesture recognized by the recognition engine 32.

Figure 3:
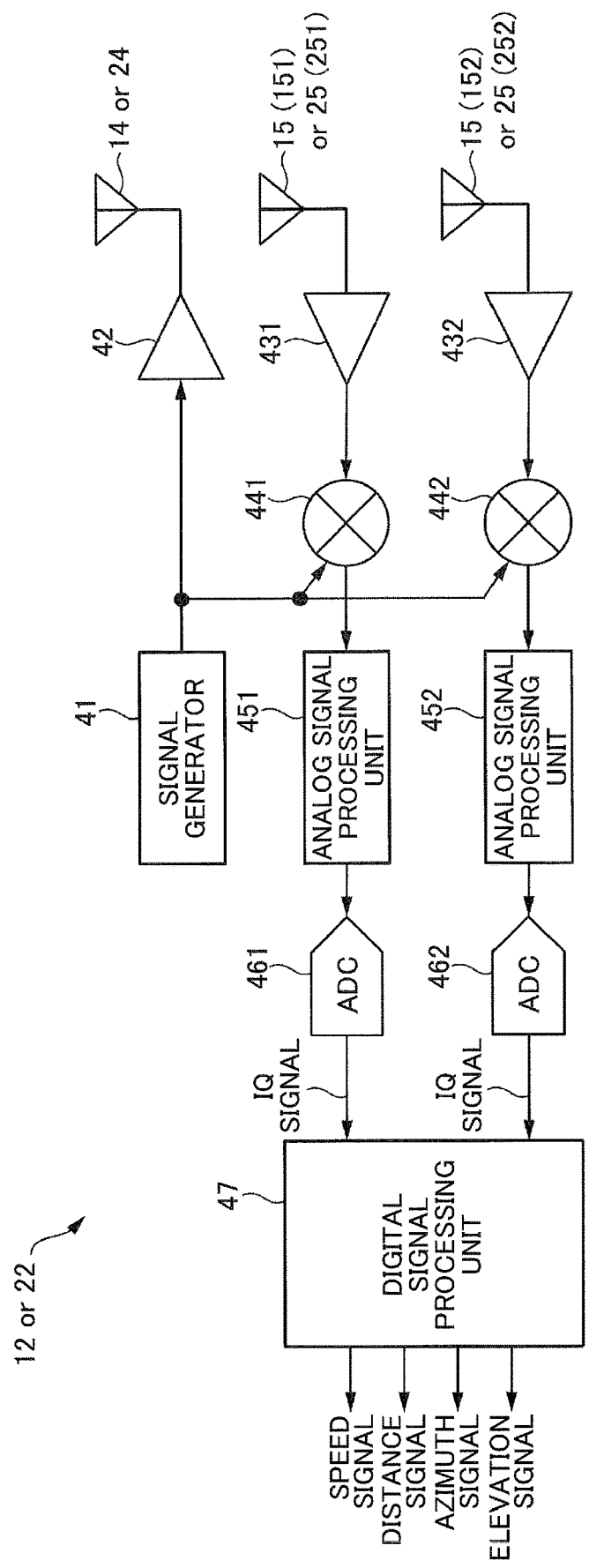
FIG. 3 is a block diagram illustrating a configuration example of a radio wave sensor of FIG. 2.

FIG. 3 illustrates a configuration example of the radio wave sensors 12 and 22 of FIG. 2. Since the radio wave sensors 12 and 22 have the same configuration, the configuration of the radio wave sensor 12 will be described below. The radio wave sensor 12 includes a signal generator 41, an amplifier 42, amplifiers 431 and 432, mixers 441 and 442, analog signal processing units 451 and 452, analog-to-digital converters (ADCs) 461 and 462, and a digital signal processing unit 47.

The signal generator 41 generates a signal to be transmitted from the transmitting antenna 14. The amplifier 42 amplifies the signal generated by the signal generator 41 to output the signal as a radio wave from the transmitting antenna 14. Amplifiers 431 and 432 receive a radio wave received by each of the receiving antennas 151 and 152 as a signal and amplify the received signal.

Here, multiple receiving antennas 151 and 152 (or 251 and 252) can be provided to estimate the speed, distance, azimuth angle, and elevation angle of an object of a gesture detection target with respect to the radio wave sensor 12 (or 22). The radio wave is transmitted and received with the Frequency Modulated Continuous Wave (FMCW) system, for example.

The mixer 441 generates a difference signal indicating a difference between the signal output by the amplifier 431 and the signal generated by the signal generator 41. The mixer 442 generates a difference signal indicating a difference between the signal output by the amplifier 432 and the signal generated by the signal generator 41.

The analog signal processing unit 451 differentiates the difference signal generated from the mixer 441 and calculates the amount of change per unit time. The analog signal processing unit 452 differentiates the differential signal generated from the mixer 442 and calculates the amount of change per unit time. The ADC 461 generates an IQ signal, which is a set of an I signal indicating the in-phase component and a Q signal indicating the quadrature component, based on an analog signal from the analog signal processing unit 451. The ADC 462 generates an IQ signal based on the analog signal from the analog signal processing unit 452.

The digital signal processing unit 47 generates a speed signal indicating the speed, a distance signal indicating the distance, an azimuthal signal indicating the azimuthal angle, and an elevation signal indicating the elevation angle based on a difference between IQ signals output from the ADCs 461 and 462. In the radar module 10, the speed signal, the distance signal, the azimuth signal, and the elevation signal are output to the slave controller 11, and in the radar module 20, the speed signal, the distance signal, the azimuth signal, and the elevation signal are output to the slave controller 21.

The speed, distance, azimuth, and elevation signal generated in each of the radar modules 10 and 20 are transferred to the recognition engine 32 of FIG. 2, so that the gesture is recognized by the recognition engine 32. When the recognition engine 32 can recognize the gesture based on the IQ signal, each of the radio wave sensors 12 and 22 may not include the digital signal processing unit 47. Also, when the recognition engine 32 can recognize the gesture based on the analog signal processed by the analog signal processing units 451 and 452, the radio wave sensor 12 (or 22) may not include the ADCs 461 and 462, and the digital signal processing unit 47.

Figure 4:
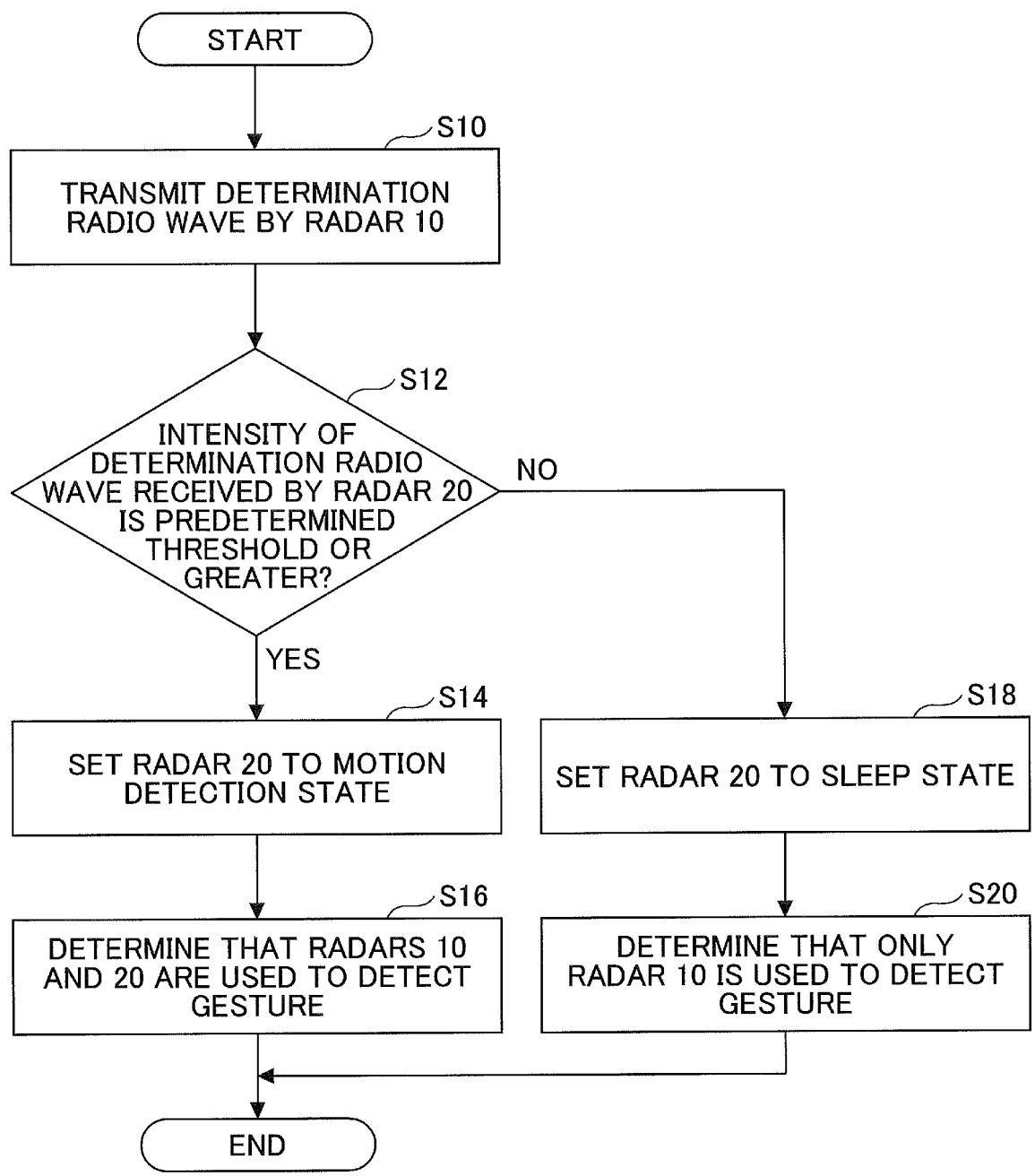
FIG. 4 is a flowchart illustrating an operation example of determining a radar module to be used for detecting a gesture in the motion detection system of FIG. 2.

FIG. 4 illustrates an operation example of determining the radar modules 10 and 20 to be used for detecting a gesture in the motion detection system 100 of FIG. 2. That is, FIG. 4 illustrates an example of a control method of the motion detection system 100. Hereinafter, the radar module 10 is also referred to as the radar 10, and the radar module 20 is also referred to as the radar 20.

For example, the operation illustrated in FIG. 4 is started by a gesturing person P (FIG. 1) operating the mobile terminal 30 and launching the motion detection system 100 before gesturing. The operation illustrated in FIG. 4 is performed by the radars 10 and 20 under the control of the master controller 31. The operation illustrated in FIG. 4 may be performed by the radars 10 and 20 under the control of the slave controller 11 instructed by the master controller 31.

First, in step S10, the radar 10 transmits the determination radio wave. The determination radio wave preferably differs from the radio wave for detecting the gesture, for example. Thus, the radar 20 that receives the determination radio wave can determine that the received radio wave is a radio wave for determining a radar to be used for detecting the gesture, and the operation illustrated in FIG. 4 can be performed correctly.

Next, in step S12, the radar 20 determines whether the intensity of the received determination radio wave is greater than or equal to a predetermined threshold value. The radar 20 transmits a determined result to the master controller 31, for example. When the intensity of the determination radio wave is greater than or equal to the threshold value, the master controller 31 performs step S14, and when the intensity of the determination radio wave is smaller than the threshold value, the master controller 31 performs step S18. Here, a case in which the intensity of the determination radio wave is smaller than the threshold value, includes a case in which the radar 20 does not detect the determination radio wave and does not transmit the determined result to the master controller 31 (i.e., a state of no response).

In step S14, the master controller 31 issues an instruction to set the radio wave sensor 22 of the radar 20 to a motion detection state (i.e., a motion detection mode), to the slave controller 21. Here, the motion detection state is a state in which the radio wave sensor 22 transmits and receives a radio wave for detecting the gesture and detects a motion of the object of the gesture detection target. The slave controller 21 sets the radio wave sensor 22 to the motion detection state based on the instruction from the master controller 31.

Next, in step S16, the master controller 31 determines that both of the radars 10 and 20 are used to detect the gesture, and terminates the process illustrated in FIG. 4.

In step S18, the master controller 31 issues an instruction to set the radio wave sensor 22 of the radar 20 to a sleep state (i.e., a sleep mode), to the slave controller 21. The slave controller 21 sets the radio wave sensor 22 to the sleep state based on the instruction from the master controller 31.

The sleep state is a state in which the radio wave sensor 22 stops transmitting and receiving the radio wave for detecting the gesture, and is one of low power consumption states (i.e., low power consumption modes). The radar 20 may set the slave controller 21 or the wireless communication unit 23 to the sleep state. The power consumption of the radar 20 can be reduced by stopping an operation of any circuit of the radar 20 illustrated in FIG. 3. The slave controller 21 is an example of a controller that sets the radio wave sensor to the motion detection state or the low power consumption state.

When the radar 20 receives a sleep cancellation instruction, such as an interrupt request to the slave controller 21, during the sleep state, the radar 20 cancels the sleep state and transitions to the motion detection state, for example. The low power consumption state of the radar 20 is a sleep state in which the radar 20 returns to the motion detection state in response to the sleep cancellation instruction, instead of a power shutoff state, so that when it is necessary to detect a motion of an object, the radar 20 can transition to the motion detection state without being operated by the person P or the like.

Next, in step S20, the master controller 31 determines that only the radar 10 is used to detect the gesture, and terminates the process illustrated in FIG. 4.

In the embodiment, the radar 10 transmits the determination radio wave to determine whether the radar 20 is at a position where the gesture of the person P can be detected. When the radar 20 is not at a position where the gesture can be detected, the radar 20 is set to the low power consumption state. This can reduce the power consumption of the radar 20 and increase the operating time of the radar 20 operated by the battery, for example. Additionally, the transmission of the radio wave from the radar 20 which does not contribute to the gesture detection, can be stopped, thereby preventing the radio wave sensor 12 of the radar 10 from receiving unnecessary radio waves, and preventing the accuracy of the gesture detection by the radar 10 from being reduced.

The master controller 31 may cause a radar other than the radar 10 (which is not illustrated in FIG. 1 and FIG. 2) to transmit the determination radio wave. Alternatively, the master controller 31 may instruct the radar 20 to transmit the determination radio wave and determines the radar to be used for the gesture detection (only the radar 10 or both the radar 10 and the radar 20) based on the intensity of the determination radio wave received by the radar 10 from the radar 20. Furthermore, a process similar to the process of FIG. 4 is performed when the gesture is detected using the radar modules 10 and 20, and a radar module other than the radar modules 10 and 20.

Figure 5:
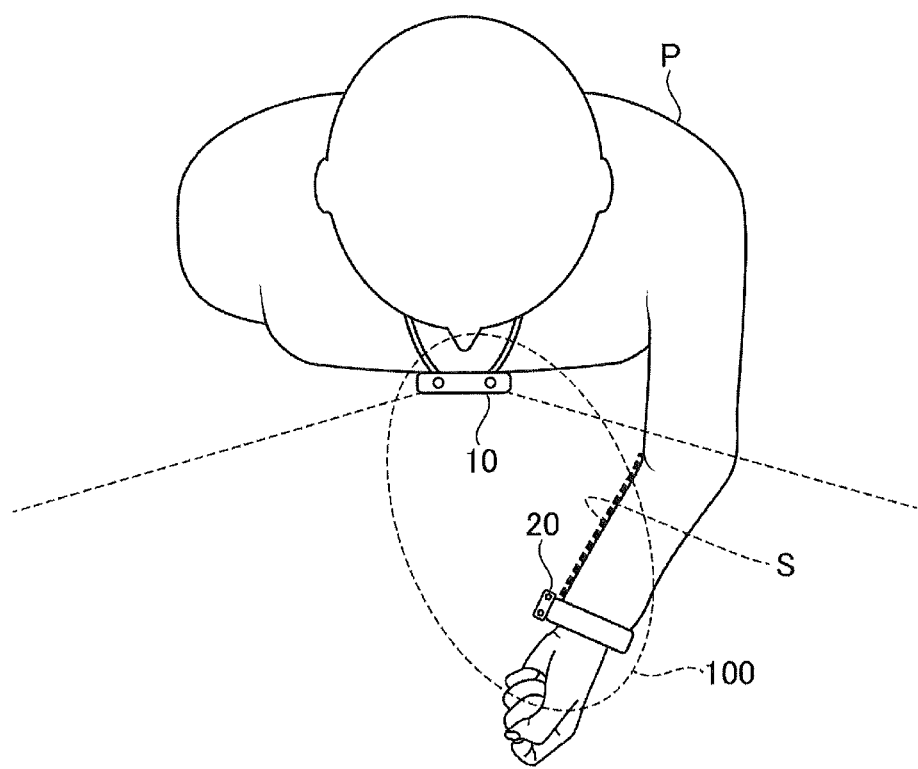
FIG. 5 is an explanatory drawing illustrating another method of determining a radar module to be used for detecting a gesture in the motion detection system of FIG. 2.

FIG. 5 illustrates another method of determining the radar modules 10 and 20 to be used for detecting the gesture in the motion detection system of FIG. 2. In the example illustrated in FIG. 5, when the radar 10 transmits the determination radio wave and detects that a shape representing a body part to which the radar 20 is attached is at a predetermined position based on the reflected wave of the determination radio wave, it is determined that the gesture can be detected using the radar 20.

In FIG. 5, the dashed line extending from the radar 10 to a front of the person P indicates an irradiation range of the radio wave transmitted by the radar 10. In the example illustrated in FIG. 5 in which the radar 20 is attached to the wrist of the left hand, the radar 10 determines that the gesture can be detected using the radar 20 when a shape S representing the left forearm, illustrated by the thick dashed line, horizontally extends to a predetermined position in front of the radar 10 (i.e., in front of the body).

Figure 6:
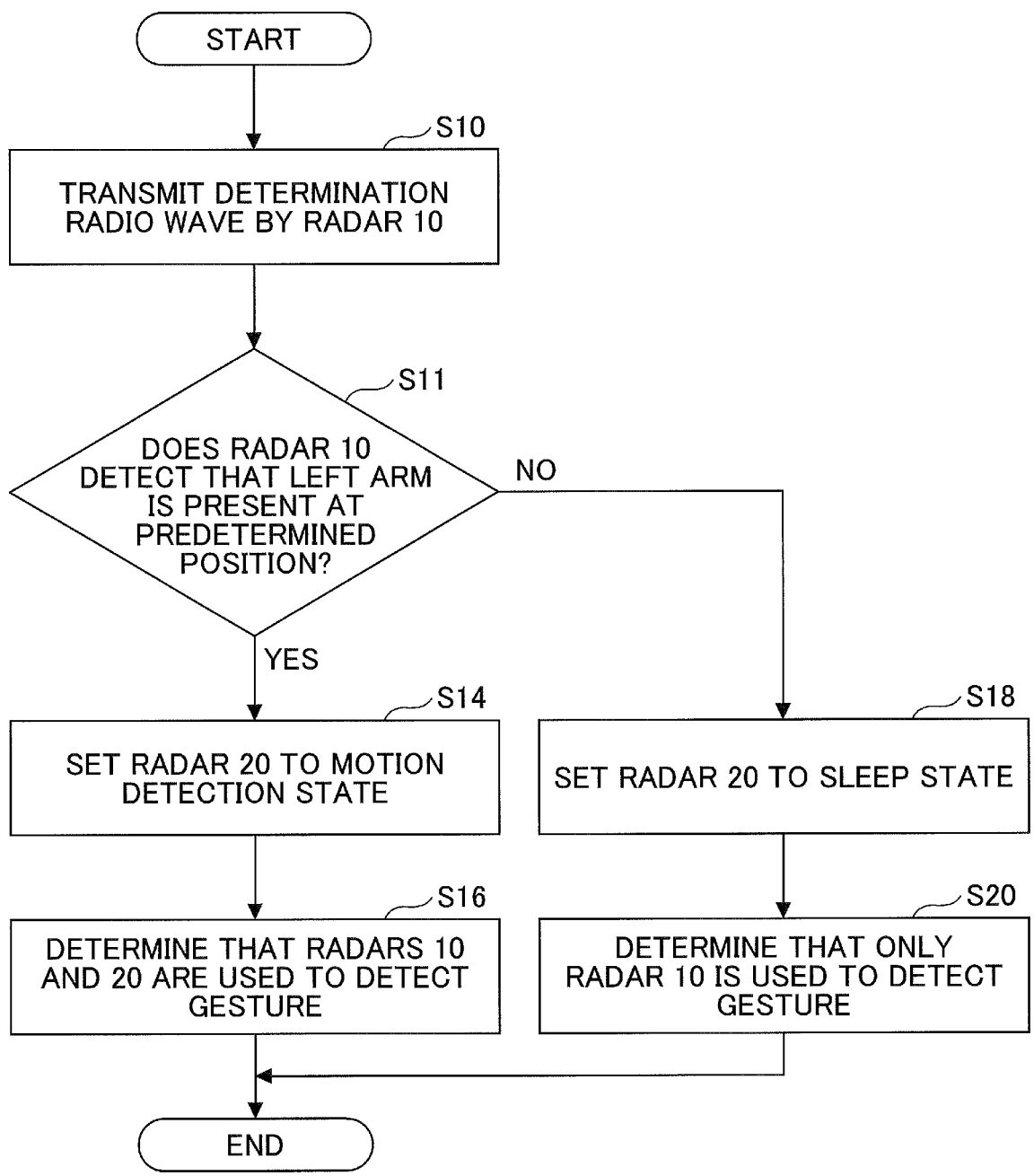
FIG. 6 is a flowchart illustrating an operation example of determining a radar module to be used for detecting a gesture by the method illustrated in FIG. 5.

FIG. 6 illustrates an operation example of determining the radar modules 10 and 20 to be used for detecting the gesture by the method illustrated in FIG. 5. Operations similar to the operations in FIG. 4 are referenced by the same reference numerals and the detailed descriptions are omitted. FIG. 6 is similar to FIG. 4 except that step S11 is performed instead of step S12 of FIG. 4.

In step S11, the radar 10 determines whether it is detected that the left forearm is present at a predetermined position based on the reflected wave of the transmitted determination wave. The radar 10 transmits a determined result to the master controller 31. The master controller 31 performs step S14 when the radar 10 detects that the left forearm is present at the predetermined position, and performs step S18 when the radar 10 detects that the left forearm is not present at the predetermined position. That is, when the radar 10 detects that the left forearm is present at the predetermined position, the master controller 31 judges that the radar 20 is at a position where the gesture can be detected and determines that both the radars 10 and 20 are used to detect the gesture.

In FIG. 5 and FIG. 6, the radar 10 detects that the shape representing the body part to which the radar 20 is attached is at the predetermined position, so that the radars 10 and 20 to be used for detecting the gesture can be determined without causing the radar 20 to transmit and receive the radio wave.

Figure 7:
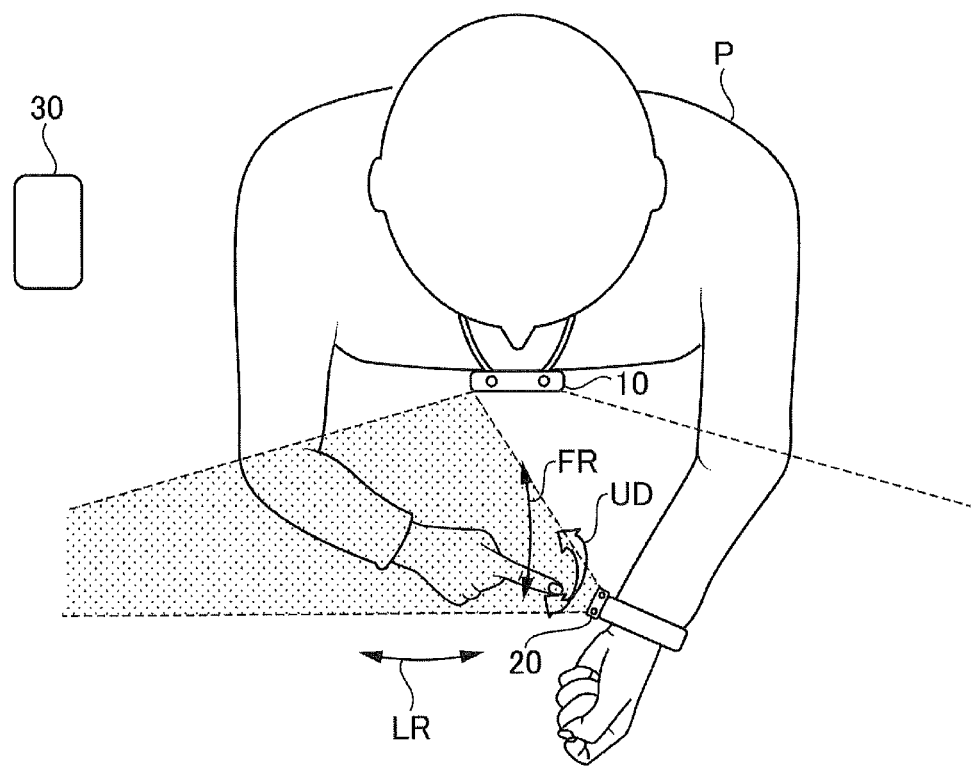
FIG. 7 is an explanatory drawing illustrating an example of detecting a gesture in the motion detection system of FIG. 1.

FIG. 7 illustrates an example of detecting the gesture in the motion detection system of FIG. 1. In the embodiment, the motion detection system 100 detects each of gestures of waving the right hand index finger in the front and rear direction FR, in the left and right direction LR, and the up and down direction UD with respect to the front of the body, and operates a device or the like based on the detected gesture.

In the operation of FIG. 4 or FIG. 6, when it is determined that both the radars 10 and 20 are used to detect the gesture, the motion detection system 100 detects a motion of the index finger in the shaded area of FIG. 7 by using the radars 10 and 20. By using the radars 10 and 20 to detect the gesture, the radio waves can be irradiated to the part of the gesture detection target in different directions to receive reflected waves. This can facilitate detecting the gesture and improve the accuracy of the detection.

With respect to the above, in the operation of FIG. 4 or FIG. 6, when it is determined that only the radar 10 is used to detect the gesture, the motion detection system 100 detects a motion of the index finger only with the radar 10 without using the radar 20. When only the radar 10 is used to detect the gesture, it may be difficult to detect the gesture when a motion of the part of the gesture detection target is small, for example. Additionally, when another part is placed between the part of the gesture detection target and the radar 10, the gesture may not be detected. That is, the accuracy of the gesture detection is reduced.

Figure 8:
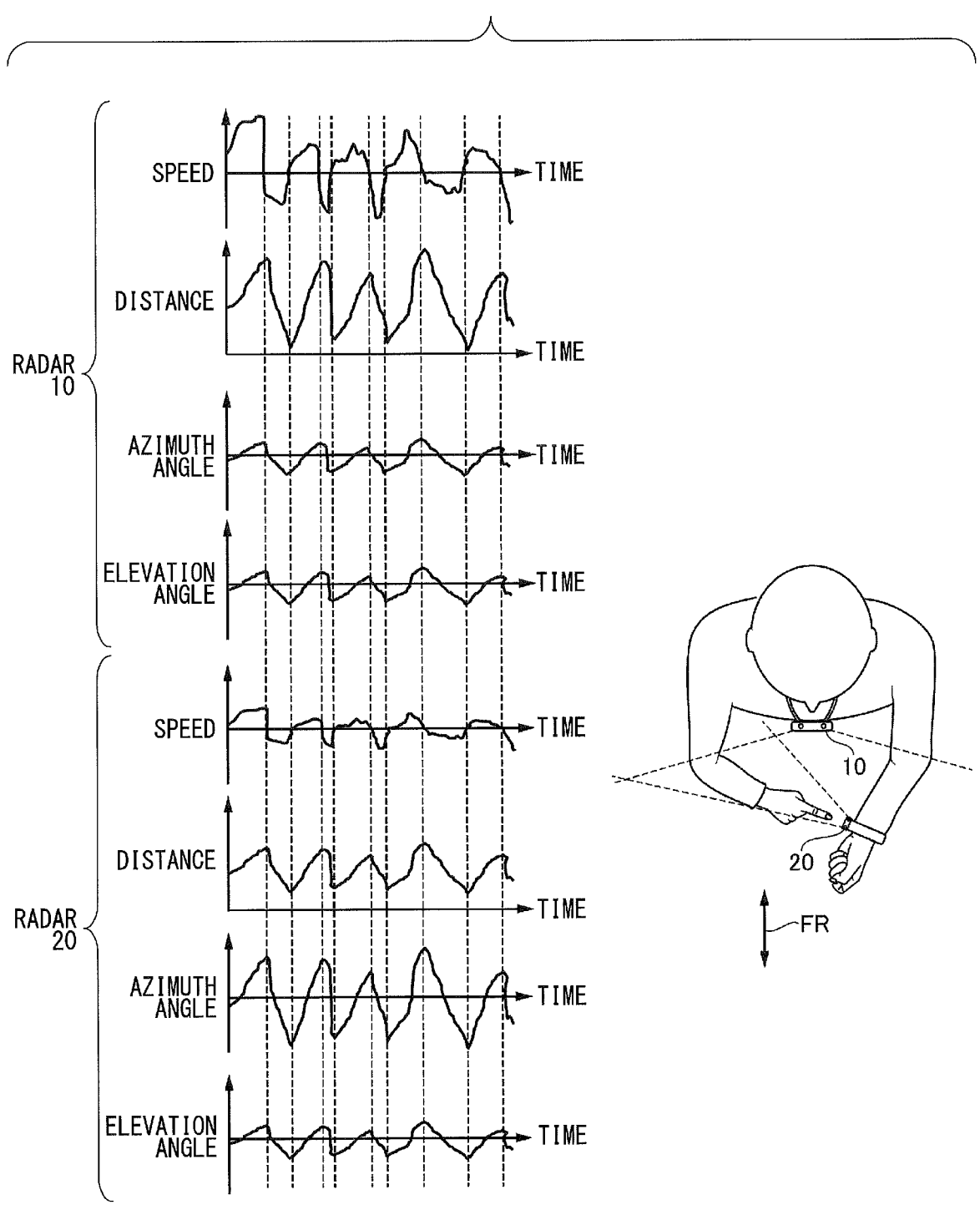
FIG. 8 is a timing chart illustrating an example of waveforms of changes in the speed, distance, azimuth angle, and elevation angle that are detected by each radar module when the index finger of the right hand is waved in the front and rear direction.

FIG. 8 illustrates an example of waveforms of changes in the speed, distance, azimuth and elevation angle detected by each of the radar modules 10 and 20 when the right hand index finger is waved in the front and rear direction FR. When it is determined that only the radar 10 is used to detect the gesture in the operation of FIG. 4 or FIG. 6, since the radar 20 does not operate, the waveforms of the radar 20 illustrated on the lower side of FIG. 8 are not generated.

When the right hand index finger is waved in the front and rear direction FR, in the radar 10, the amounts of changes in the speed and the distance are greater than the amounts of changes in the azimuth and elevation angles. In the radar 20, the amount of change in the azimuth angle is greater than the amounts of changes in the speed, the distance, and the elevation angle.

Figure 9:
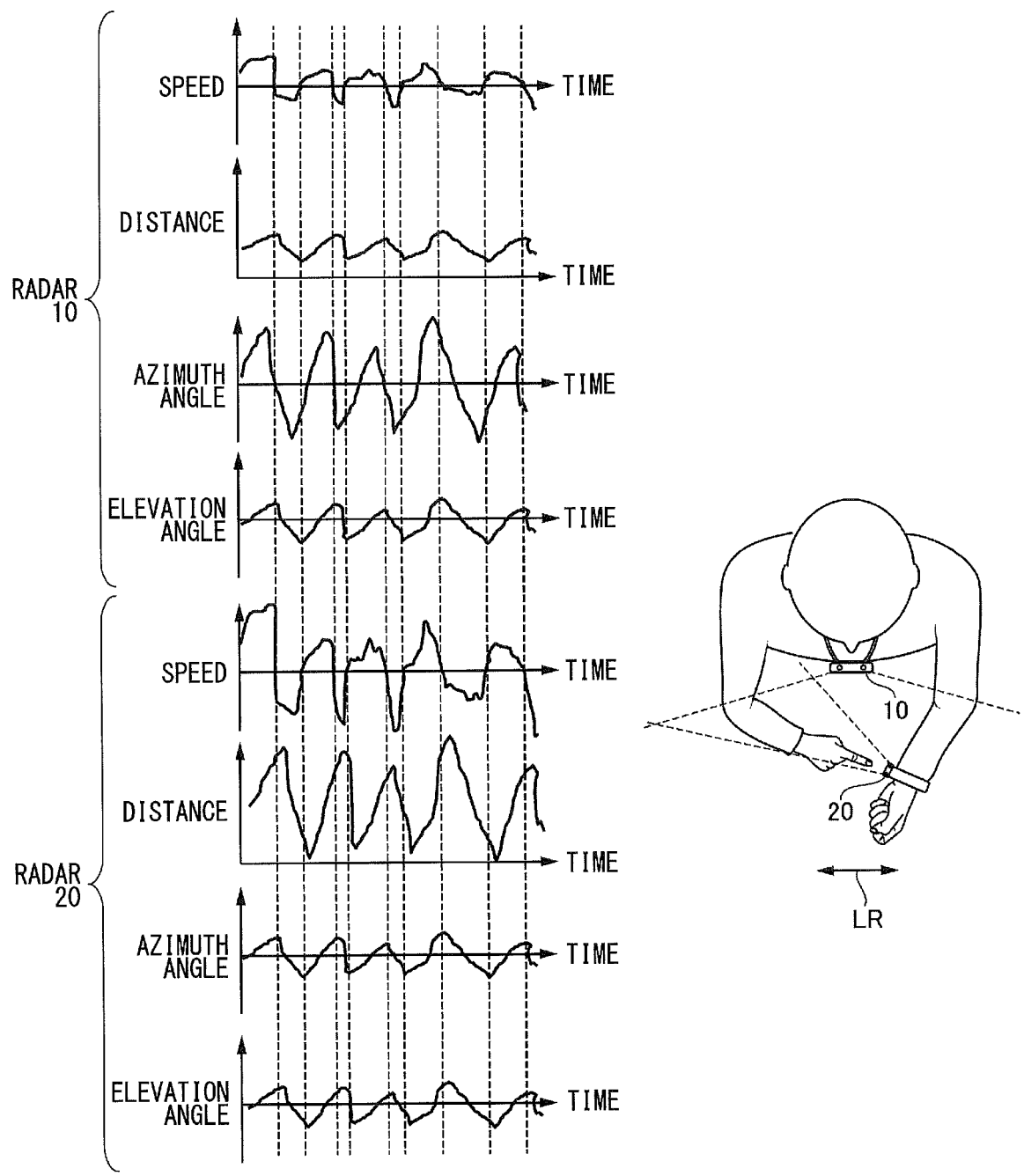
FIG. 9 is a timing chart illustrating an example of waveforms of changes in the speed, distance, azimuth angle, and elevation angle that are detected by each radar module when the index finger of the right hand is waved in the left and right direction.

FIG. 9 illustrates an example of waveforms of changes in the speed, distance, azimuth angle and elevation angle that are detected by each of the radar modules 10 and 20 when the right hand index finger is waved in the left and right direction LR. When it is determined that only the radar 10 is used to detect the gesture through the operation of FIG. 4 or FIG. 6, since the radar 20 does not operate, the waveforms of the radar illustrated on the lower side of FIG. 9 are not generated.

When the right hand index finger is waved in the left right direction LR, in the radar 10, the amount of change in the azimuth angle is greater than the amounts of changes in the speed, the distance, and the elevation angle. In the radar 20, the amounts of changes in the speed and the distance are greater than the amounts of the changes in the azimuth angle and the elevation angle.

Figure 10:
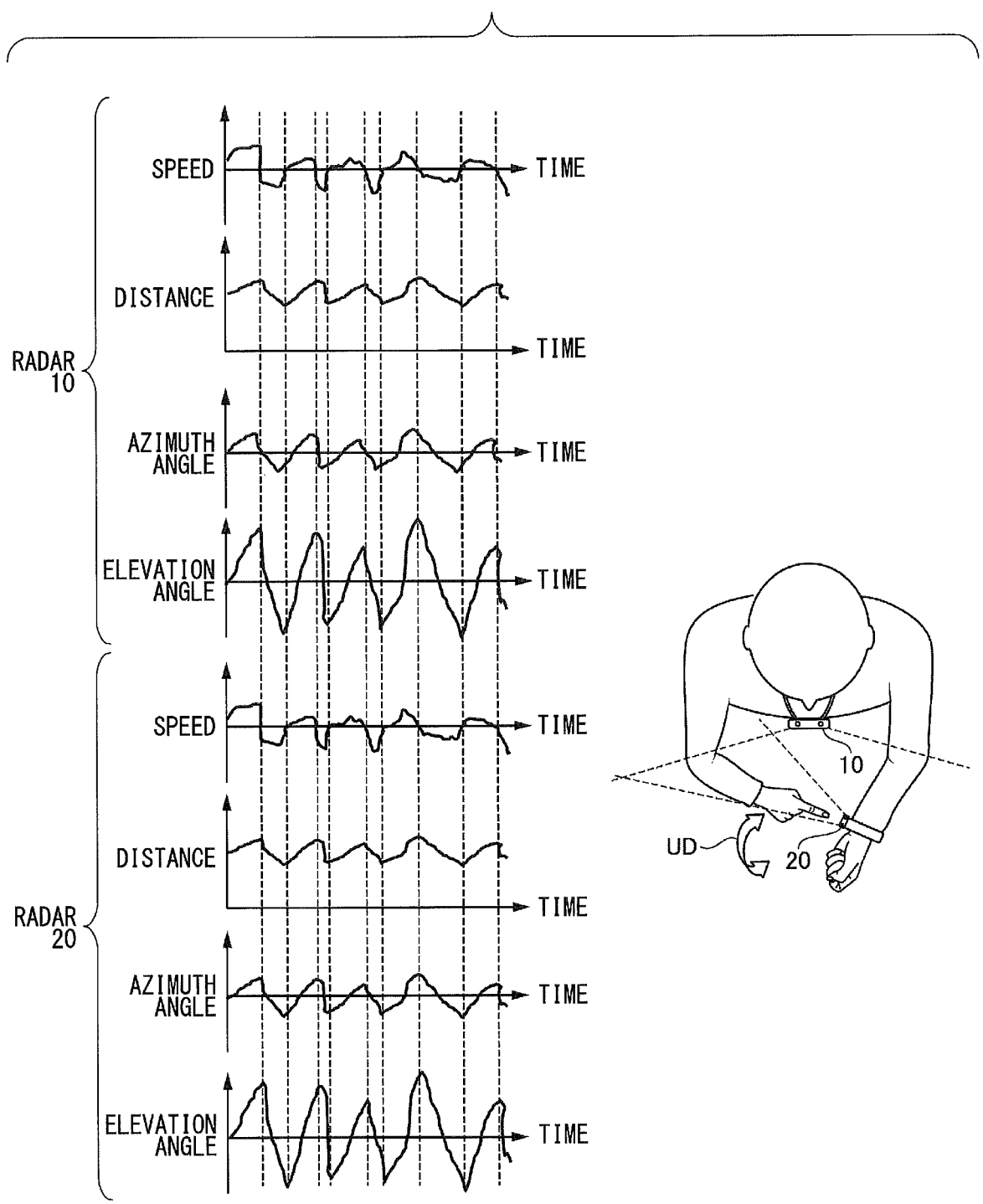
FIG. 10 is a timing chart illustrating an example of waveforms of changes in the speed, distance, azimuth angle, and elevation angle that are detected by each radar module when the index finger of the right hand is waved in the up and down direction.

FIG. 10 illustrates an example of waveforms of changes in the speed, distance, azimuth angle and elevation angle that are detected by each of the radar modules 10 and 20 when the right hand index finger is waved in the up and down direction UD. When it is determined that only the radar 10 is used to detect the gesture through the operation of FIG. 4 or FIG. 6, since the radar 20 does not operate, the waveforms of the radar illustrated on the lower side of FIG. 10 are not generated.

When the right hand index finger is waved in the up and down direction UD, in both radars 10 and 20, the amount of change in the elevation angle is greater than the amount of changes in the speed, the distance, and the azimuth angle.

As illustrated in FIGS. 8 to 10, when the amount of change in the speed is large, the amount of change in the distance is large, and when the amount of change in the speed is small, the amount of change in the distance is small. Thus, each of the radars 10 and 20 may transfer either the speed signal or the distance signal to the recognition engine 32. In this case, the recognition engine 32 recognizes the gesture based on either the speed signal or the distance signal, and the azimuth signal, and the elevation signal.

Figure 11:
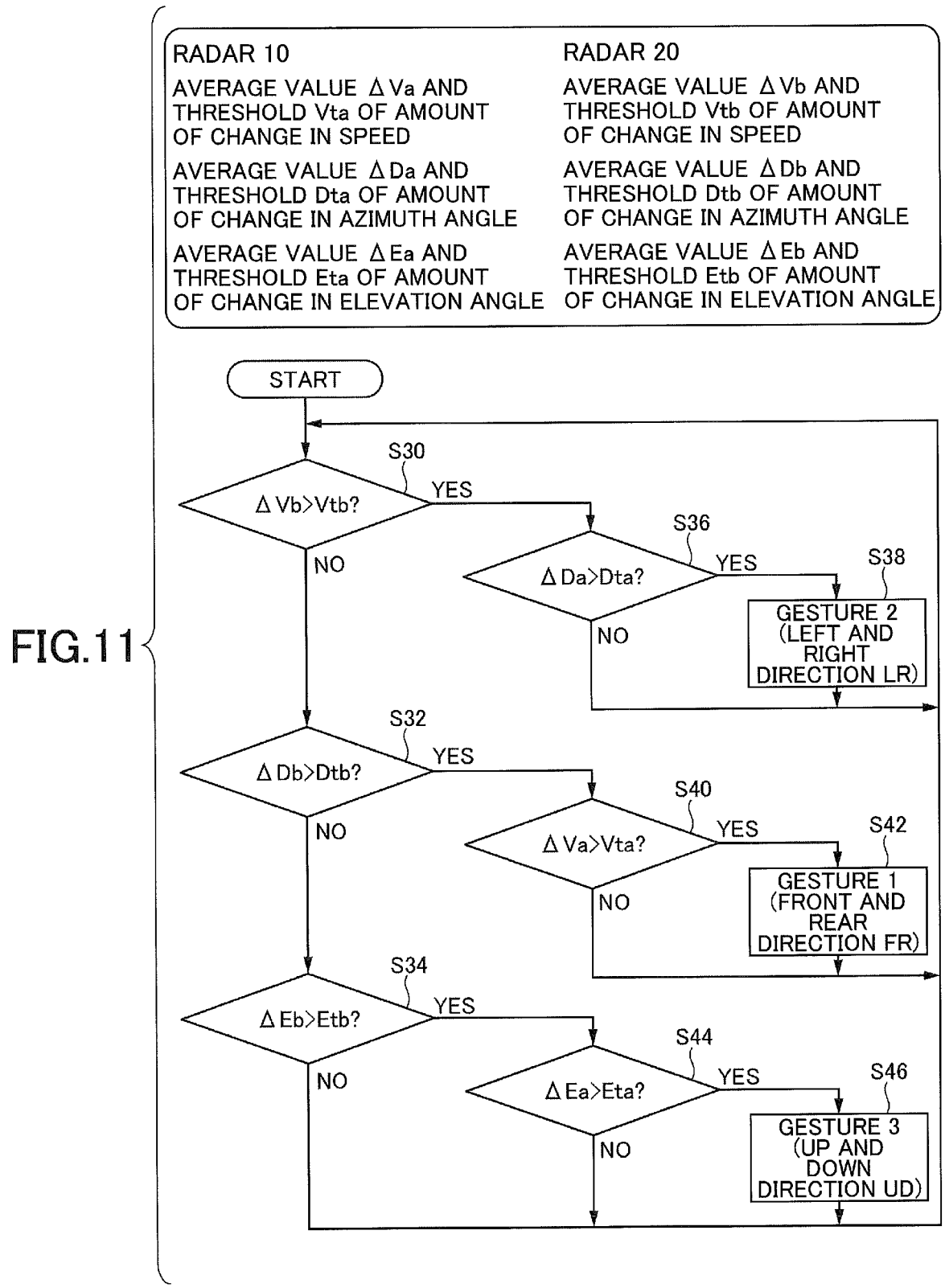
FIG. 11 is a flowchart illustrating an example of recognizing a gesture by using the recognition engine of FIG. 2 when both radars of FIG. 2 are used to detect a gesture.

FIG. 11 illustrates an example of recognizing the gesture by the recognition engine 32 of FIG. 2 when both of the radars 10 and 20 of FIG. 2 are used to detect the gesture. The operation illustrated in FIG. 11 is started in response to the recognition engine 32 receiving the speed signal, the azimuth signal, and the elevation signal from each of the radars 10 and 20. The operation illustrated in FIG. 11 is stopped when the recognition engine 32 no longer receives the speed signal, the azimuth signal, and the elevation signal from each of the radars 10 and 20. The distance signal may be used instead of the speed signal.

For example, the recognition engine 32 calculates values $\Delta Va$, $\Delta Vb$, $\Delta Da$, $\Delta Db$, $\Delta Ea$, and $\Delta Eb$ for each of the radars 10 and 20 before starting the process of FIG. 11. The value $\Delta Va$ represents an average value of the amount of change in the speed per unit time detected by the radar 10. The value $\Delta Vb$ represents an average value of the amount of change in the speed per unit time detected by the radar 20.

The value $\Delta Da$ represents an average value of the amount of change in the azimuthal angle per unit time detected by the radar 10. The value $\Delta Db$ represents an average value of the amount of change in the azimuthal angle per unit time detected by the radar 20. The value $\Delta Ea$ represents an average value of the amount of change in the elevation angle per unit time detected by the radar 10. The value $\Delta Eb$ represents an average value of the amount of change in the elevation angle per unit time detected by the radar 20.

For example, the amount of changes in the speed, the azimuthal angle and the elevation angle are indicated by the amplitude of the waveforms illustrated in FIGS. 8 to 10, and the average values of changes in the speed, the azimuthal angle, and the elevation angle are calculated from at least two cycles of respective waveforms. FIGS. 8 to 10 illustrate four cycles of the waveform.

First, in step S30, when the average value $\Delta Vb$ of the amount of change in the speed detected by the radar 20 is greater than a predetermined threshold value Vtb, the recognition engine 32 performs step S36, and when the average value ΔVb is smaller than or equal to the threshold value Vtb, the recognition engine 32 performs step S32. In step S32, when the average value ΔDb of the amount of change in the azimuthal angle detected by the radar 20 is greater than a predetermined threshold value Dtb, the recognition engine 32 performs step S40, and when the average value ΔDb is smaller than or equal to the threshold value Dtb, the recognition engine 32 performs step S34.

In step S34, when the average value ΔEb of the amount of change in the elevation angle detected by the radar 20 is greater than a predetermined threshold value Etb, the recognition engine 32 performs step S44, and when the average value ΔEb is smaller than or equal to the threshold value Etb, the process returns to step S30.

In step S36, when the average value ΔDa of the amount of change in the azimuthal angle detected by the radar 10 is greater than a predetermined threshold value Dta, the recognition engine 32 performs step S38, and when the average value ΔDa is smaller than or equal to the threshold value Dta, the process returns to step S30. In step S38, the recognition engine 32 recognizes that the detected gesture is a gesture 2 of the right hand index finger being waved in the left right direction LR, and notifies the master controller 31 of a recognition result. The process returns to step S30.

In step S40, when the average value ΔVa of the amount of change in the speed detected by the radar 10 is greater than a predetermined threshold value Vta, the recognition engine 32 performs step S42, and when the average value ΔVa is smaller than or equal to the threshold value Vta, the process returns to step S30. In step S42, the recognition engine 32 recognizes that the detected gesture is a gesture 1 of the right hand index finger being waved in the front and rear direction FR, and notifies the master controller 31 of a recognition result. The process returns to step S30.

In step S44, when the average value ΔEa of the amount of change in the elevation angle detected by the radar 10 is greater than a predetermined threshold value Eta, the recognition engine 32 performs step S46, and when the average value ΔEa is smaller than or equal to the threshold value Eta, the process returns to S30. In step S46, the recognition engine 32 recognizes that the detected gesture is a gesture 3 of the right hand index finger being waved in the up and down direction UD, and notifies the master controller 31 of a recognition result. The process returns to step S30.

Figure 12:
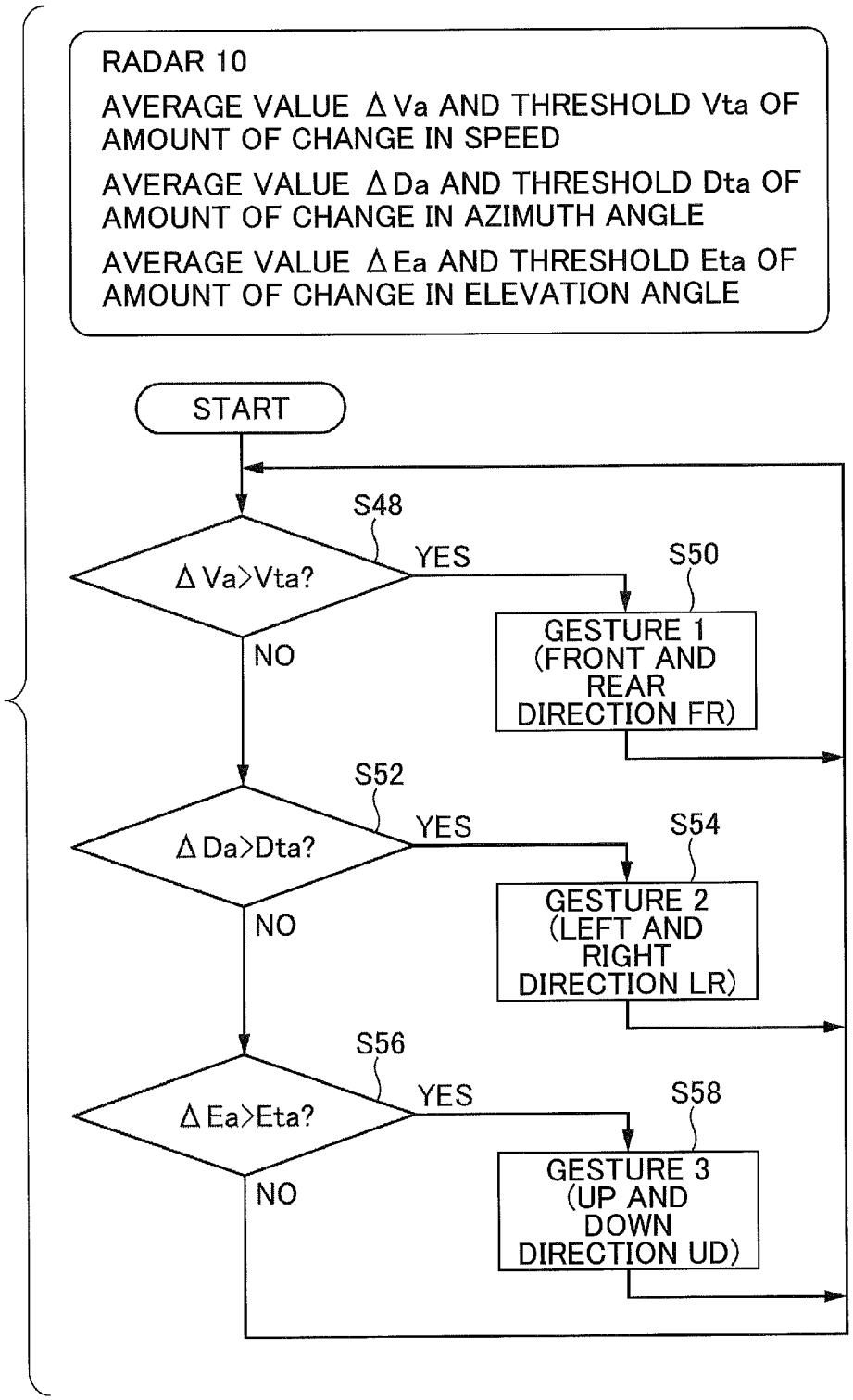
FIG. 12 is a flowchart illustrating an example of recognizing a gesture by using the recognition engine of FIG. 2 when one radar of FIG. 2 is used to detect a gesture.

FIG. 12 illustrates an example of recognizing the gesture by the recognition engine 32 of FIG. 2 when one radar 10 is used to detect the gesture. In FIG. 12, the recognition engine 32 also calculates the average value ΔVa of the amount of change in the speed, the average value ΔDa of the amount of change in the azimuthal angle, and the average value ΔEa of the change in the elevation angle that are detected by the radar 10 before starting the process of FIG. 12.

First, in step S48, when the average value ΔVa of the amount of change in the speed detected by the radar 10 is greater than the threshold value Vta, the recognition engine 32 performs step S50, and when the average value ΔVa is smaller than or equal to the threshold value Vta, the recognition engine 32 performs step S52. In step S50, the recognition engine 32 recognizes that the detected gesture is the gesture 1 of the right hand index finger being waved in the front and rear direction FR. The process returns to step S48.

In step S52, when the average value ΔDa of the amount of change in the azimuthal angle detected by the radar 10 is greater than the threshold value Dta, the recognition engine 32 performs step S54, and when the average value ΔDa is smaller than or equal to the threshold value Dta, the recognition engine 32 performs step S56. In step S54, the recognition engine 32 recognizes that the detected gesture is the gesture 2 of the right hand index finger being waved in the left and right direction LR. The process returns to step S48.

In step S56, when the average value ΔEa of the amount of change in the elevation angle detected by the radar 10 is greater than the threshold value Eta, the recognition engine 32 performs step S58, and when the average value ΔEa is smaller than or equal to the threshold value Eta, the process returns to step S48. In step S58, the recognition engine 32 recognizes that the detected gesture is a gesture 3 of the right hand index finger being waved in the up and down direction UD. The process returns to step S48.

Figure 13:
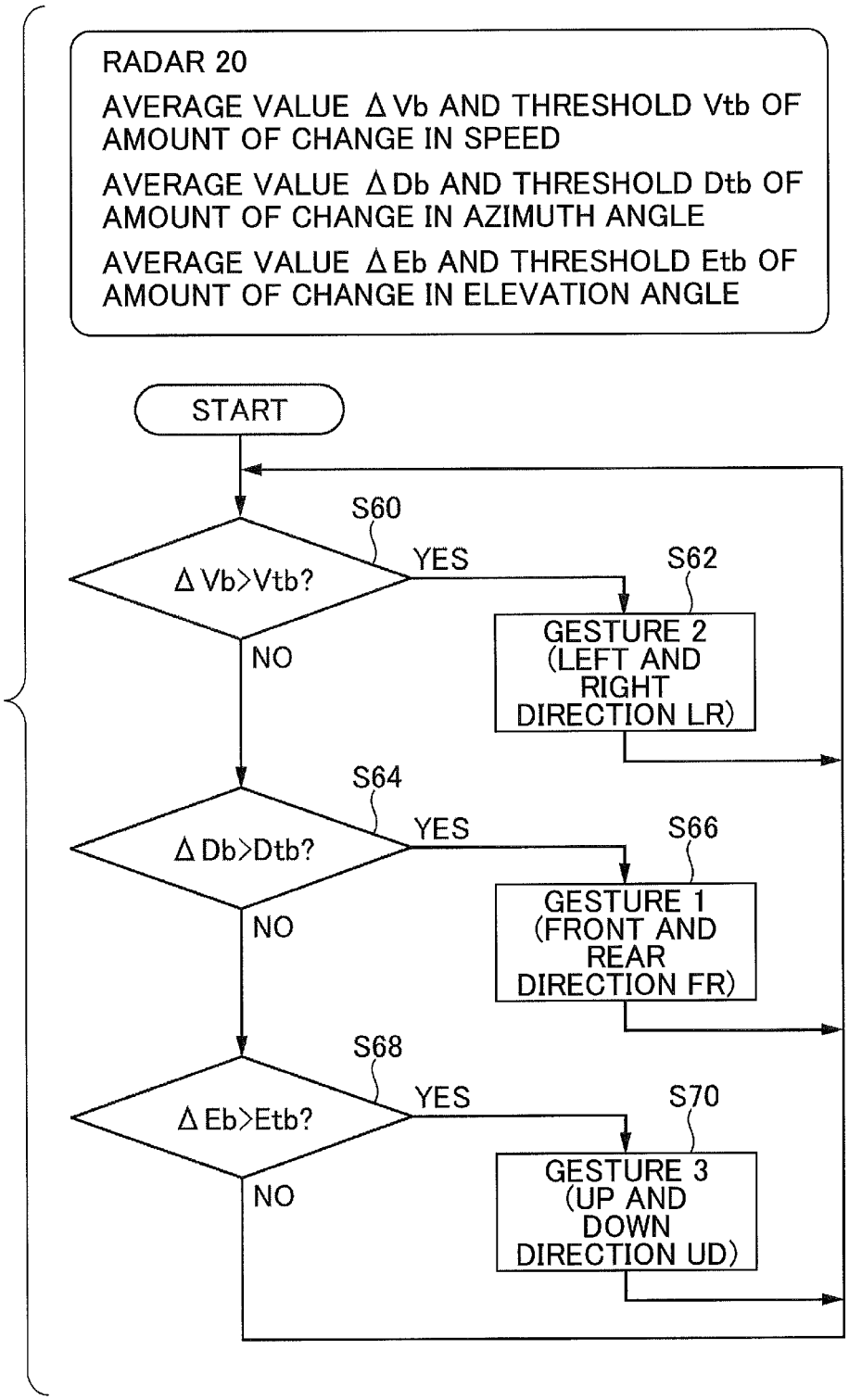
FIG. 13 is a flowchart illustrating another example of recognizing a gesture by using the recognition engine of FIG. 2 when one radar of FIG. 2 is used to detect a gesture.

FIG. 13 illustrates another example of recognizing the gesture by the recognition engine of FIG. 2 when one radar 20 is used to detect the gesture. FIG. 13 indicates that when both of the radars 10 and 20 are used to detect the gesture, if the battery of the radar runs out, even only the radar 20 can detect the gesture, for example. In FIG. 13, the recognition engine 32 also calculates the average value ΔVb of the amount of change in the speed, the average value ΔDb of the amount of change in the azimuthal angle, and the average value ΔEb of the amount of change in the elevation angle that are detected by the radar 20 before starting the process of FIG. 13.

First, in step S60, when the average value ΔVb of the amount of change in the speed detected by the radar 20 is greater than the threshold value Vtb, the recognition engine 32 performs step S62, and when the average value ΔVb is smaller than or equal to the threshold value Vtb, the recognition engine 32 performs step S64. In step S62, the recognition engine 32 recognizes that the detected gesture is the gesture 2 of the right hand index finger being waved in the left and right direction LR. The process returns to step S60.

In step S64, when the average value ΔDb of the amount of change in the azimuthal angle detected by the radar 20 is greater than the threshold value Dtb, the recognition engine 32 performs step S66, and when the average value ΔDb is smaller than or equal to the threshold value Dtb, the recognition engine 32 performs step S68. In step S66, the recognition engine 32 recognizes that the detected gesture is the gesture 1 of the right hand index finger being waved in the front and rear direction FR. The process returns to step S60.

In step S68, when the average value ΔEb of the amount of change in the elevation angle detected by the radar 20 is greater than the threshold value Etb, the recognition engine 32 performs step S70, and when the average value ΔEb is smaller than or equal to the threshold value Etb, the process returns to step S60. In step S70, the recognition engine 32 recognizes that the detected gesture is the gesture 3 of the right hand index finger being waved in the up and down direction UD. The process returns to step S60.

Figure 14:
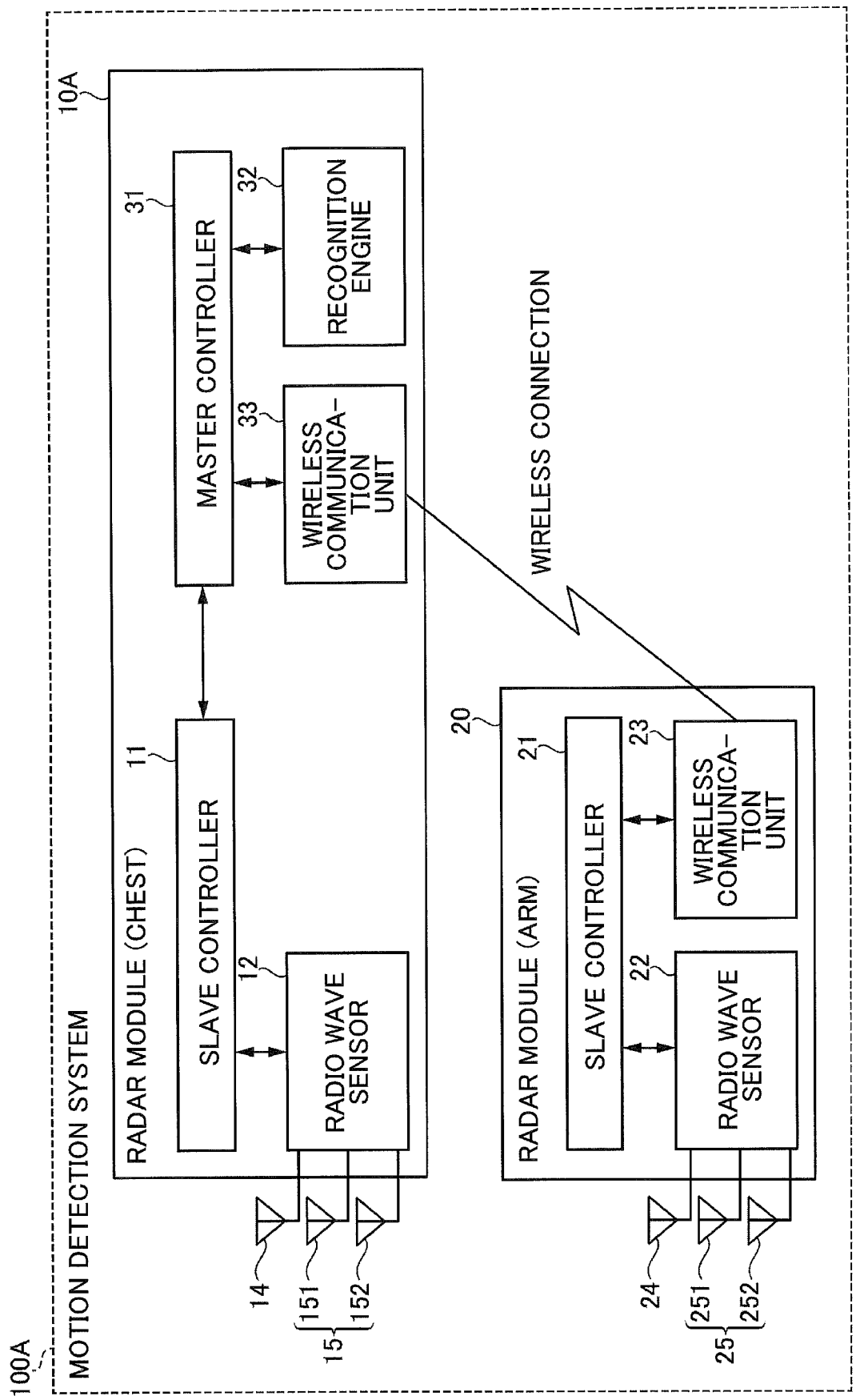
FIG. 14 is a block diagram illustrating another configuration example of the motion detection system.

FIG. 14 illustrates another configuration example of the motion detection system. Elements similar to the elements in FIG. 2 are referenced by the same reference numerals, and the detailed descriptions are omitted. The motion detection system 100A illustrated in FIG. 14 includes a radar module 10A and the radar module 20. The radar module 10A includes the master controller 31, the recognition engine 32, and the wireless communication unit 33, which are illustrated in FIG. 2. Thus, the motion detection system 100A does not include the mobile terminal 30 illustrated in FIG. 2. The wireless communication unit 33 communicates with the wireless communication unit 23 of the radar module 20. The radar module 10A does not include the wireless communication unit 13 illustrated in FIG. 2, and the slave controller 11 is coupled to the wireless communication unit 33 through the master controller 31. The radar module 10A is an example of the motion detection device.

In the motion detection system 100A illustrated in FIG. 14, the gesture can be detected by the radar module 10A without using the mobile terminal 30 illustrated in FIG. 2. The radar module 10A may include a touch panel serving as an operating unit and a display unit. The master controller 31 and the recognition engine 32 may also be included in the radar module 20 instead of being included in the radar module 10A.

The motion detection system 100A determines whether the radar modules 10A and 20 are used or only the radar module 10A is used to detect the gesture through the process illustrated in FIG. 4 and FIG. 6. The recognition engine 32 of the motion detection system 100A detects the gesture through the process illustrated in FIGS. 11 to 13.

Figure 15:
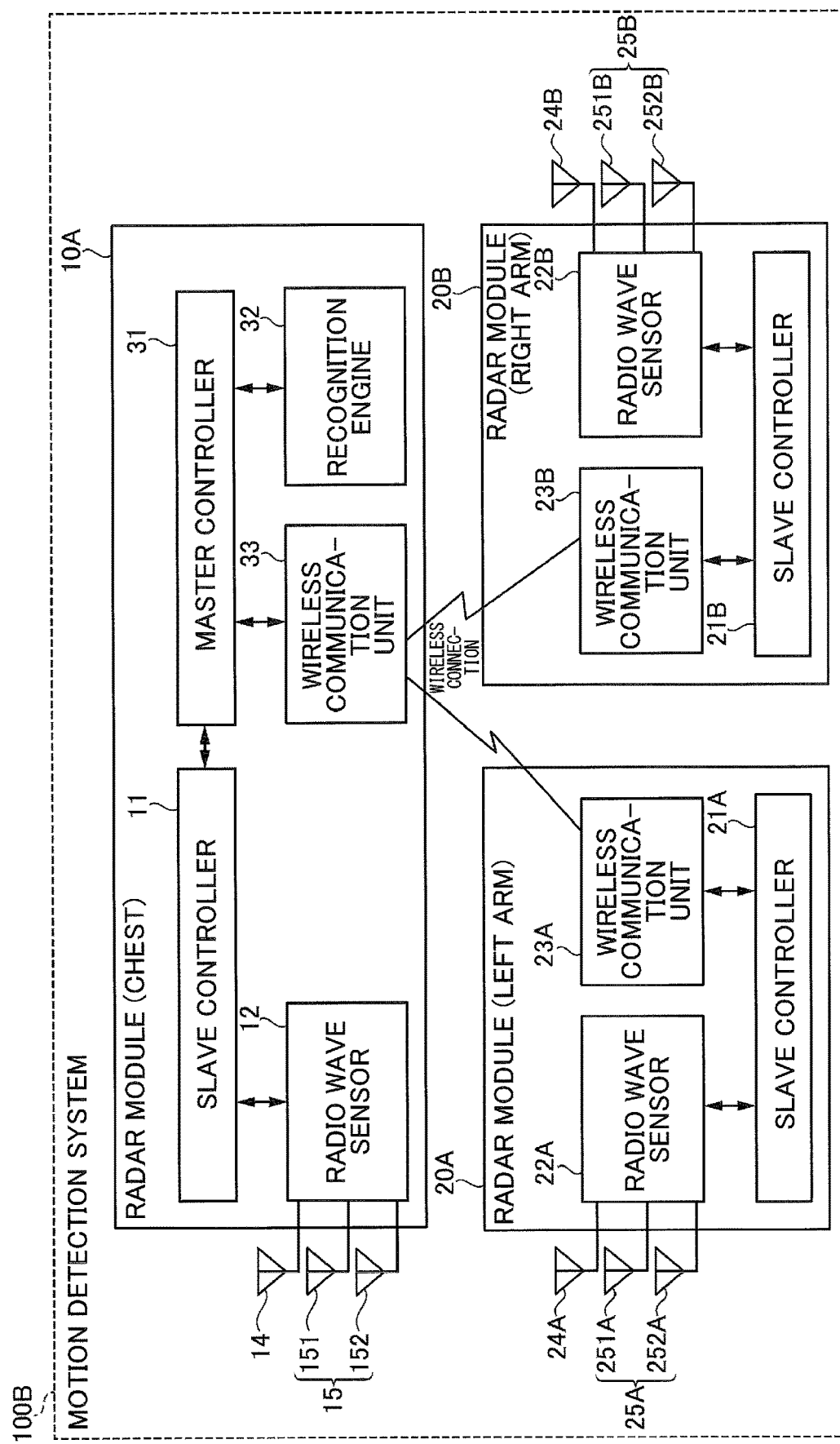
FIG. 15 is a block diagram illustrating another configuration example of the motion detection system.

FIG. 15 illustrates another configuration example of the motion detection system. Elements similar to the elements of FIG. 2 and FIG. 14 are referenced by the same reference numerals, and the detailed descriptions are omitted. The motion detection system 100B illustrated in FIG. 15 includes the radar module 10A as in FIG. 14, a radar module 20A attached to the left arm (e.g., the left wrist), and a radar module 20B attached to the right arm (e.g., the right wrist). Hereinafter, the radar modules 10A, 20A, and 20B are also referred to as the radars 10A, 20A, and 20B. The radars 20A and 20B are examples of the motion detection device.

The radars 20A and 20B have the same configuration and are, for example, the same configuration as the radar 20 illustrated in FIG. 2. In the following, for clarification of the description, "A" is added to the reference numerals of the elements included in the radar 20A, and "B" is added to the reference numerals of the elements included in the radar 20B.

The radar 20A includes a slave controller 21A, a radio wave sensor 22A, a wireless communication unit 23A, a transmitting antenna 24A, and a receiving antenna 25A. Multiple receiving antennas 25A are provided and for example, two receiving antennas 251A and 252A are provided. The number of the receiving antennas 25A may be three or more. The radar 20B includes a slave controller 21B, a radio wave sensor 22B, a wireless communication unit 23B, a transmitting antenna 24B, and a receiving antenna 25B. Multiple receiving antennas 25B are provided and for example, two receiving antennas 251B and 252B are provided. The number of the receiving antennas 25B may be three or more.

The wireless communication unit 33 of the radar 10A communicates with the wireless communication units 23A and 23B. The recognition engine 32 recognizes the gesture based on a result of detection of a motion of the finger or the like by the radars 10A, 20A, and 20B. The recognition engine 32 may recognize the gesture based on a result of detection of a motion of the finger or the like by the radars 10A and 20A, or may recognize the gesture based on a result of detection of a motion of the finger or the like by the radars 10A and 20B. Alternatively, the recognition engine 32 may recognize the gesture based on a result of detection of a motion of a finger or the like by only the radar 10A.

The motion detection system 100B determines whether the radar modules 10A, 20A, and 20B are used or only radar modules 10A are used to detect the gesture through a process similar to the process illustrated in FIG. 4 or FIG. 6. Further, the motion detection system 100B determines whether the radar modules 10A and 20A are used or the radar modules 10A and 20B are used through a process similar to the process illustrated in FIG. 4 or FIG. 6. The recognition engine 32 of the motion detection system 100B detects the gesture through a process similar to the processes illustrated in FIGS. 11 to 13.

FIG. 16 illustrates an example of operating a device or the like in a room based on the gesture recognized by the motion detection system 100B of FIG. 15. For example, when the motion detection system 100B detects a gesture of opening both hands outwardly, the motion detection system 100B sends an instruction to open a curtain 202 to a controller of the curtain 202 (which is not illustrated), and the curtain 202 is opened. When the motion detection system 100B detects a gesture of closing both hands inwardly from the outside, the motion detection system 100B sends an instruction to close the curtain 202 to the controller of the curtain 202, and the curtain 202 is closed.

When the motion detection system 100B detects a gesture of fanning with the right hand or the left hand, the motion detection system 100B sends an instruction to perform a cooling operation to an air conditioner 204, and the air conditioner 204 starts the cooling operation. When the motion detection system 100B detects a gesture of wiping a floor with the palm of the right hand or the palm of the left hand downward, the motion detection system 100B sends an operation instruction to a robot vacuum cleaner 206, and the robot vacuum cleaner 206 starts cleaning.

The motion detection system 100B may perform processing for converting contents of the sign language by the person P into text or voice.

Figure 17:
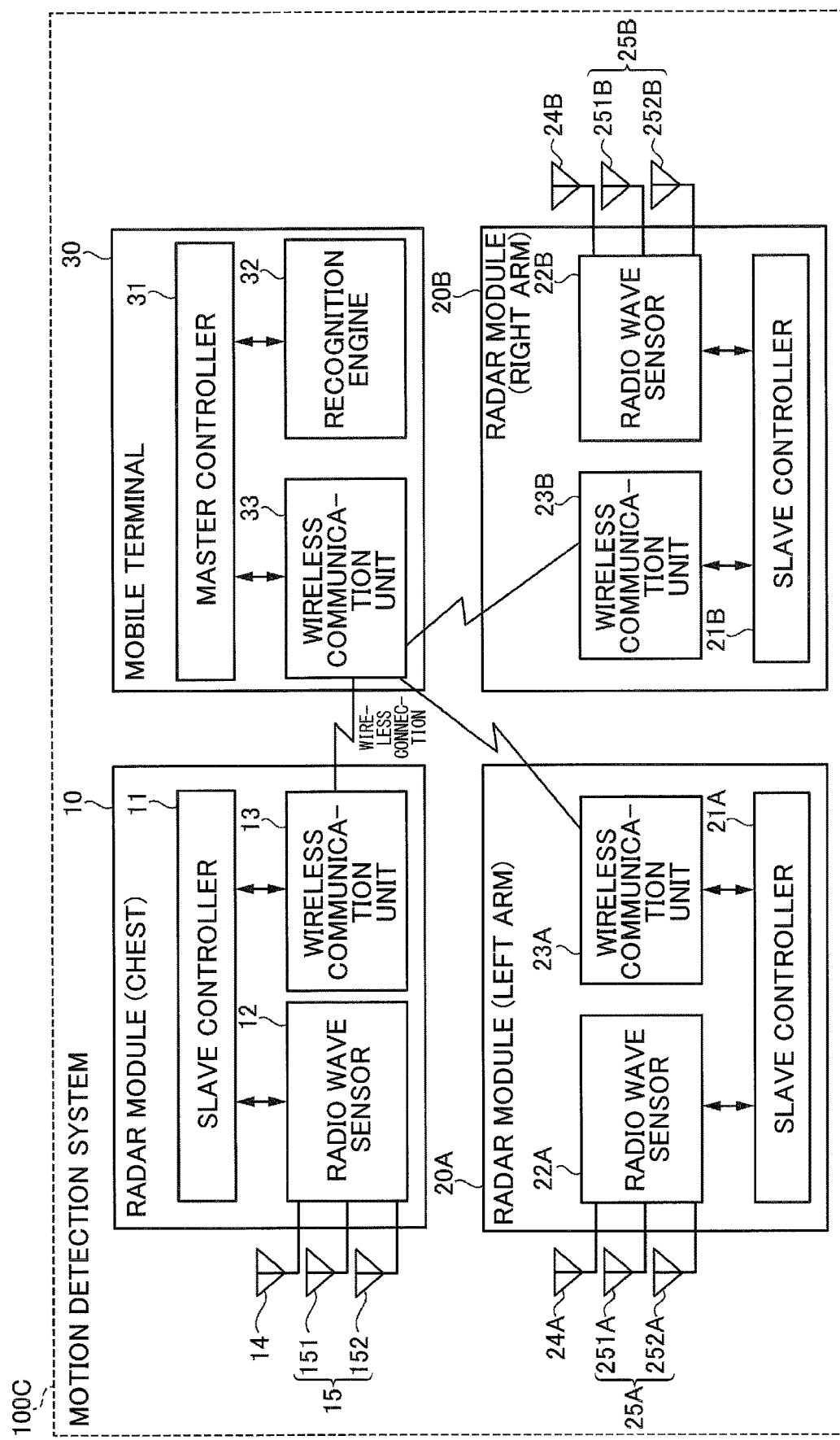
FIG. 17 is a block diagram illustrating another configuration example of the motion detection system.

FIG. 17 illustrates another configuration example of the motion detection system. Elements similar to the elements of FIG. 2 and FIG. 15 are referenced by the same reference numerals, and the detailed descriptions are omitted. The motion detection system 100C illustrated in FIG. 15 includes the radar module 10, the radar modules 20A and 20B, and the mobile terminal 30. That is, the motion detection system 100C has a configuration in which the radar module 20B for the right arm is added to the motion detection system 100 of FIG. 2. For example, as illustrated in FIG. 16, the motion detection system 100C can detect a gesture using both hands, and control an operation of a device based on the detected gesture.

The motion detection system 100C determines whether the radar modules 10A, 20A, and 20B are used or only the radar module 10A is used to detect the gesture through a process similar to the process illustrated in FIG. 4 or FIG. 6. The motion detection system 100C also determines whether the radar modules 10A and 20A are used or the radar modules 10A and 20B are used through a process similar to the process illustrated in FIG. 4 or FIG. 6. The recognition engine 32 of the motion detection system 100C detects the gesture through a process similar to the processes illustrated in FIGS. 11 to 13.

Figure 18:
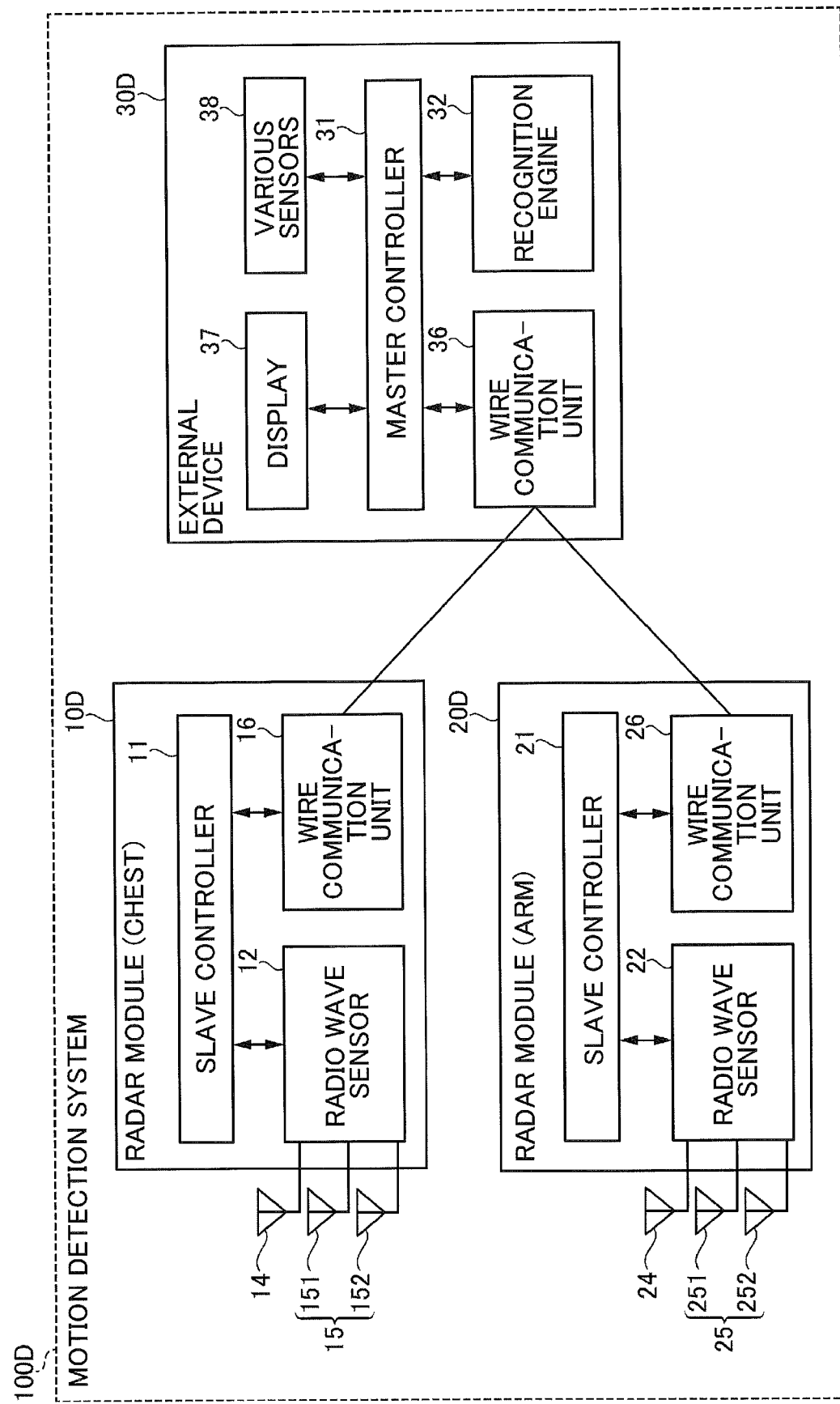
FIG. 18 is a block diagram illustrating another configuration example of the motion detection system.

FIG. 18 illustrates another configuration example of the motion detection system. Elements similar to the elements of FIG. 2 are referenced by the same reference numerals, and the detailed descriptions are omitted. The motion detection system 100D illustrated in FIG. 18 includes radar modules 10D and 20D, and an external device 30D. Hereinafter, the radar modules 10D and 20D are also referred to as the radars 10D and 20D. The radars 10D and 20D are examples of the motion detection device.

The radar 10D has a configuration and function similar to the configuration and function of the radar 10 of FIG. 2 except that the radar 10D includes a wire communication unit 16 instead of the wireless communication unit 13 of FIG. 2. The radar 20D has a configuration and function similar to the configuration and function of the radar 20 of FIG. 2 except that the radar 20D includes a wire communication unit 26 instead of the wireless communication unit 23 of FIG. 2.

The external device 30D includes the master controller 31, the recognition engine 32, a wire communication unit 36, a display 37, and various sensors 38. The external device 30D may be a head mount display for augmented reality (AR) or for virtual reality (VR), for example. The various sensors 38 may include a gyro sensor, an acceleration sensor, an image sensor, and the like, and may include another sensor. The master controller 31 has a function to control images and videos displayed on the display 37 based on a result detected by the various sensors 38, for example.

The recognition engine 32 detects the gesture using both hands based on the speed signal (or the distance signal), the azimuth signal, and the elevation signal transferred from the radars 10D and 20D, and notifies the master controller 31 of the detected gesture, for example. The master controller 31, for example, switches images and videos displayed on the display 37 based on the gesture detected by the recognition engine 32.

The radars 10D and 20D, and the external device 30D are mutually connected by wires through the wire communication units 16, 26, and 36. The speed signal (or the distance signal), the azimuth signal, and the elevation signal transferred from the radars 10D, 20D to the external device 30D are communicated through a wired connection instead of a wireless connection because the motion detection system 100D requires real-time property in detecting the gesture, for example. The radars 10D and 20D may be wirelessly connected to the external device 30D.

The motion detection system 100D determines whether the radar modules 10D and 20D are used or only the radar module 10D is used to detect the gesture through the process illustrated in FIG. 4 or FIG. 6. The recognition engine 32 of the motion detection system 100A detects the gesture through the processes illustrated in FIGS. 11 to 13.

In the embodiment, the radar modules 20, 20A, 20B, and 20D (which will be hereinafter referred to as the radar 20X) that do not contribute to detecting a motion of the object to be detected, are set to the low power consumption state. Thus, the power consumption of the motion detection system 100, 100A, 100B, 100C, and 100D (which will be hereinafter also referred to as the motion detection system 100X) can be suppressed. When the motion detection system 100X operates with battery power, the operating time can be increased. Additionally, by stopping the transmission of radio waves from the radar 20X that does not contribute to detecting the gesture, it is possible to prevent the accuracy of the gesture detection by the radar modules 10, 10A, and 10D (which will be hereinafter referred to as the radar 10X) from being reduced due to unnecessary radio waves. By using multiple radars 10X and 20X to detect the motion of the object to be detected, the accuracy of the detection can be improved.

For example, one of the radars 10X and 20X transmits the determination radio wave to the other to determine whether the radio wave sensor 22 is at a position (or a direction) in which a motion of the object to be detected can be detected based on the received intensity of the determination radio wave. Alternatively, by detecting a shape representing a body part to which the radar 20X is attached at a predetermined position based on the determination radio wave transmitted by the radar 10X, it is determined whether the radio wave sensor 22 is at a position where a motion of the object to be detected can be detected. Thus, it is possible to determine whether to set the radar 20X to the low power consumption state based on a relative positional relationship between the radar 10X and the radar 20X that detect the motion of the object to be detected. In other words, it is possible to determine whether to set the radar 20X to the low power consumption state based on actual positions of the radars 10X and 20X arranged to detect a motion of the object to be detected.

Second Embodiment

Figure 19:
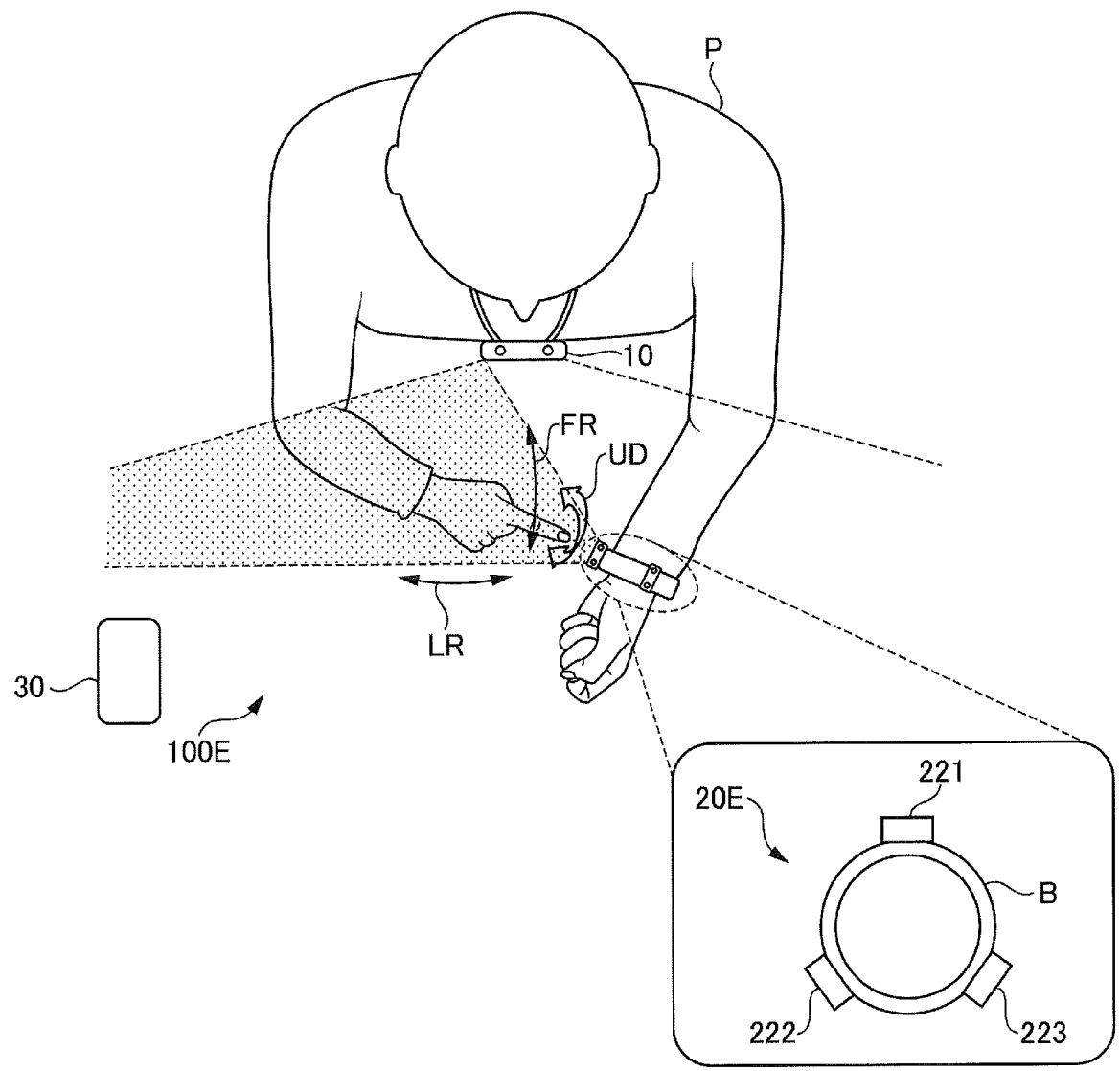
FIG. 19 is an explanatory drawing illustrating an overview of a motion detection system according to a second embodiment.

FIG. 19 illustrates an overview of a motion detection system 100E according to a second embodiment. Elements similar to FIG. 1 and FIG. 7 are referenced by the same reference numerals and the detailed descriptions are omitted. The motion detection system 100E includes, for example, the radar module 10 arranged on the chest of the person P, a radar module 20E attached to the left wrist of the person P, and the mobile terminal 30. The radar module 20E is an example of the motion detection device. Hereinafter, the radar modules 10 and 20E are also referred to as the radars 10 and 20E.

The radar 20E includes three radio wave sensors (221, 222, and 223) provided around a belt B attached to the wrist. The radio wave sensors 221, 222, and 223 are provided at equal intervals around the belt B, for example. As described below, the radar 20E uses one or two of the radio wave sensors 221, 222, and 223 to detect a motion of the object, such as the finger, and outputs a detected result as the speed signal (or the distance signal), the azimuthal signal, and the elevation signal by each of the radio wave sensors 22. The motion detection system 100E sets each of the radio wave sensors 22 that is not used to detect the motion of the object to the low power consumption state.

Figure 20:
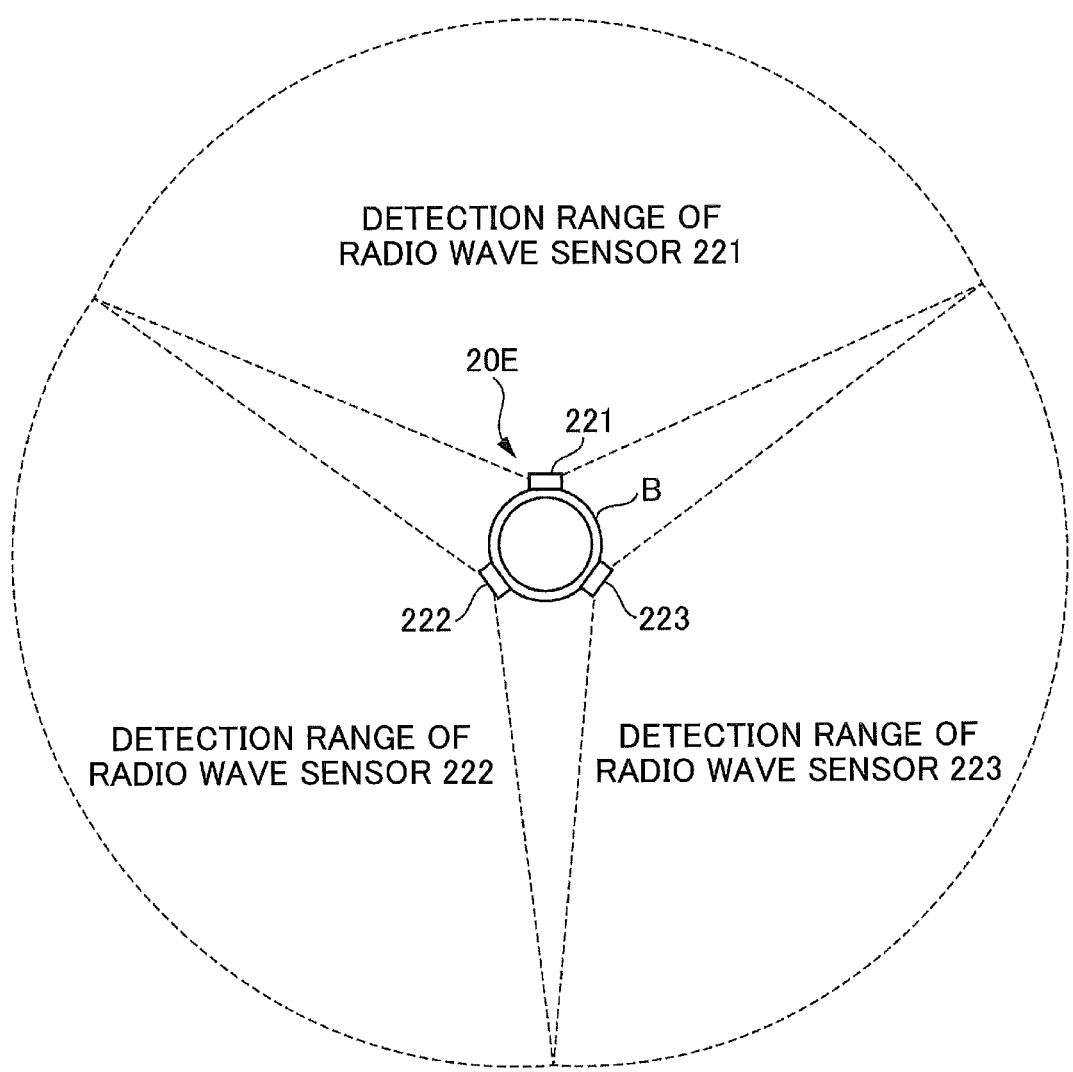
FIG. 20 is an explanatory drawing illustrating detection ranges of three radio wave sensors of the radar module of FIG. 19.

FIG. 20 illustrates detection ranges of the three radio wave sensors 221, 222, and 223 of the radar module 20E of FIG. 19. Each of the radio wave sensors 221, 222, and 223 irradiates the radio wave in a direction opposite to the center of the ring-shaped belt B, and detects the radio wave reflected by the object. Three radio wave sensors 221, 222, and 223 can provide the detection ranges of all directions around the belt B.

Figure 21:
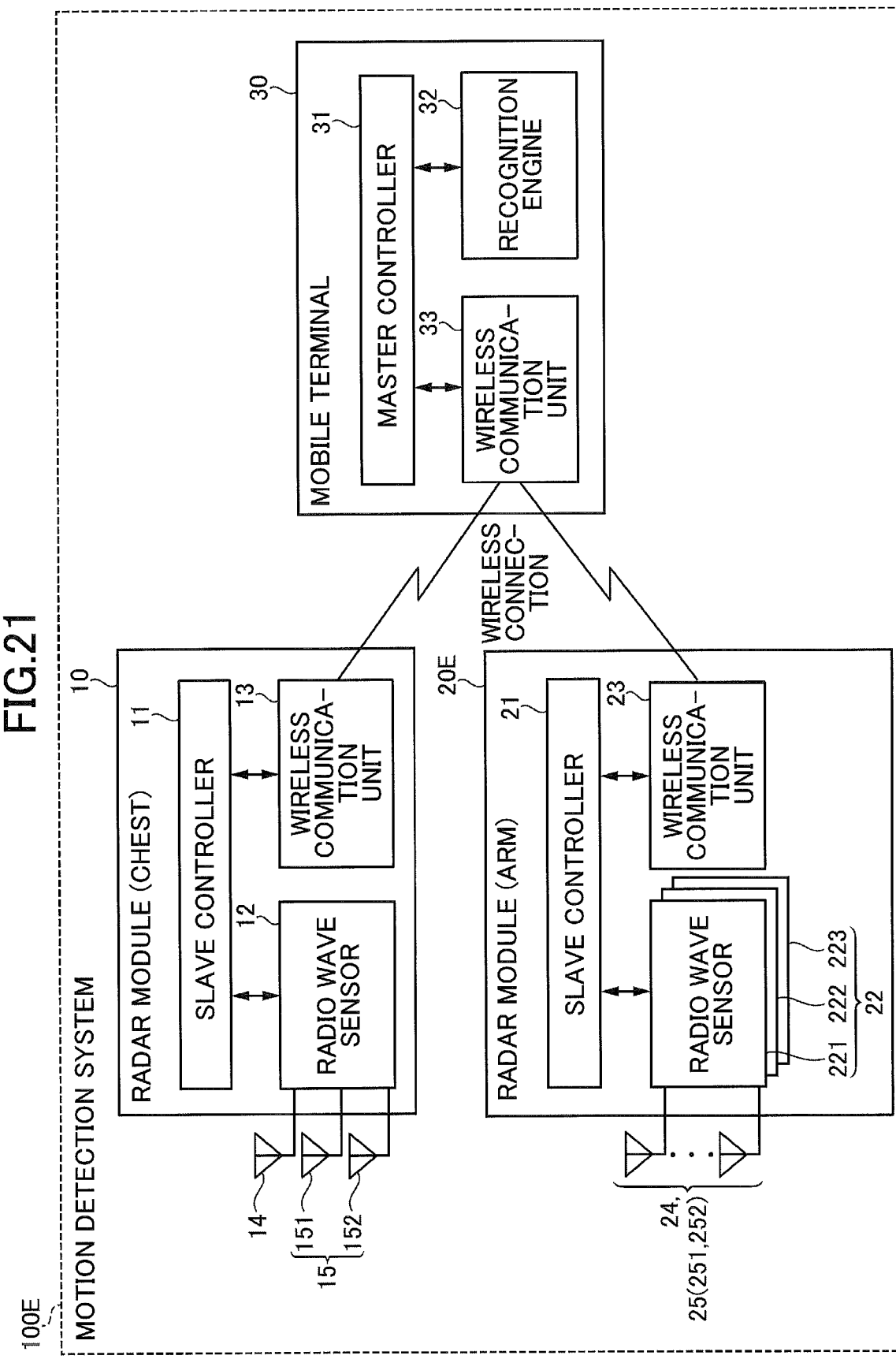
FIG. 21 is a block diagram illustrating a configuration example of the motion detection system of FIG. 19.

FIG. 21 illustrates a configuration example of the motion detection system 100E of FIG. 19. Elements similar to the elements in FIG. 2 are referenced by the same reference numerals and the detailed descriptions are omitted. As in FIG. 14, the radar 10A, which includes the master controller 31 and the recognition engine 32, may be used instead of the radar 10 without using the mobile terminal 30.

The radar 20E includes the slave controller 21 and the wireless communication unit 23 as in FIG. 2, and three radio wave sensors 22 (221, 222, and 223) illustrated in FIG. 19. Each of the radio wave sensors 22 includes the transmitting antenna 24 and the receiving antennas 251 and 252. The slave controller 21 causes the radio wave sensor 22 used for detecting the gesture to send and receive the radio wave, controls the wireless communication unit 23, and transmits data indicating the radio wave received by the radio wave sensor 22 to the mobile terminal 30. The number of radio wave sensors 22 that are caused to detect the motion may be either two, one, or zero, for example. The slave controller 21 sets each of the radio wave sensors 22 that is not used for detecting a motion of the object to the low power consumption state. A gesture is detected by the radio wave sensor 12 of the radar 10 and a fixed number of the radio wave sensors 22 that are caused to detect the motion.

Figure 22:
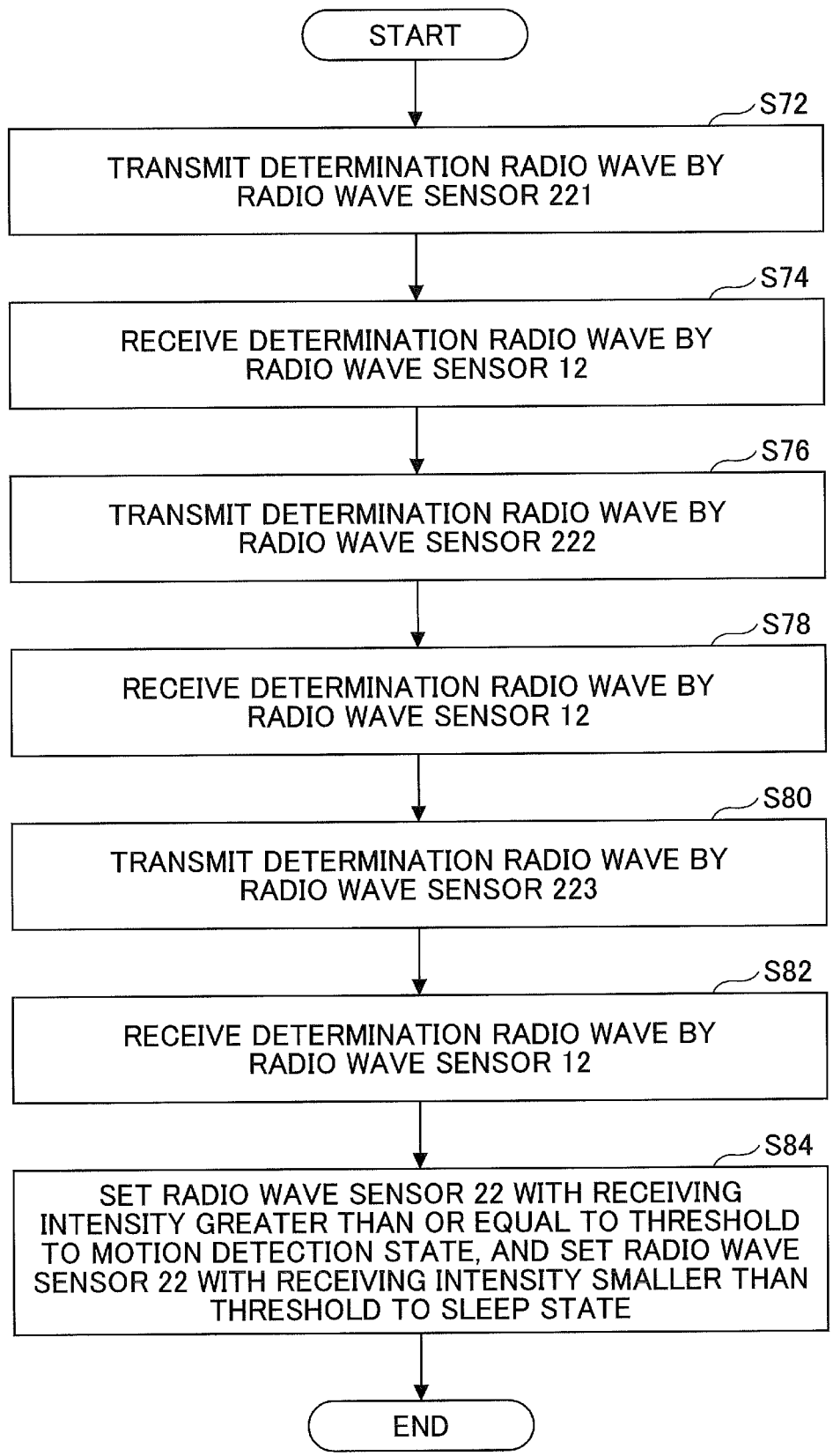
FIG. 22 is a flowchart illustrating an operation example of determining a radio wave sensor to be used for detecting a gesture in the motion detection system of FIG. 21.

FIG. 22 illustrates an operation example of determining the radio wave sensor 22 used for detecting the gesture in the motion detection system 100E of FIG. 21. That is, FIG. 22 illustrates an example of a control method of the motion detection system 100E.

The operation illustrated in FIG. 22, for example, is started by the gesturing person P (FIG. 1) operating the mobile terminal 30 and launching the motion detection system 100E before gesturing, as in FIG. 4. The master controller 31 causes the radar 20E to transmit the determination radio wave upon the start of the motion detection system 100E, and causes the radar 10 to receive the determination radio wave. In the following, as illustrated in FIG. 19, the radar 10 is hung at the chest and the radar 20E is attached to the left wrist by the belt B.

First, in step S72, the radio wave sensor 221 of the radar 20E transmits the determination radio wave. In step S74, the radio wave sensor 12 of the radar 10 receives the determination radio wave transmitted by the radio wave sensor 221 and stores the received intensity. In step S76, the radio wave sensor 222 of the radar 20E transmits the determination radio wave. In step S78, the radio wave sensor 12 of the radar 10 receives the determination radio transmitted by the radio wave sensor 222 and stores the received intensity.

Next, in step S80, the radio wave sensor 223 of the radar 20E transmits the determination radio wave. In step S82, the radio wave sensor 12 of the radar 10 receives the determination radio transmitted by the radio wave sensor 222 and stores the received intensity. Here, an order of transmitting radio waves by the radio wave sensors 221, 222, and 223 may not be the order of step S72, step S76, and step S80. The radio wave sensors 221, 222, and 223 may simultaneously transmit the determination radio waves, and the radar 10 may simultaneously receive the determination radio waves from the radio wave sensors 221, 222, and 223.

Next, in step S84, the slave controller 11 of the radar 10 issues an instruction to set each of the radio wave sensors 22 corresponding to the radio wave whose received intensity is greater than or equal to a predetermined threshold to the operation detection state, to the slave controller 21 of the radar 20E. The slave controller 11 also issues an instruction to set each of the radio wave sensors 22 whose received intensity is smaller than the predetermined threshold value to the sleep state (i.e., the low power consumption state), to the slave controller 21 of the radar 20E. An instruction to set each of the radio wave sensors 22 to the motion detection state or the sleep state is issued from the slave controller 11 to the slave controller 21 through the wireless communication units 13 and 23. The slave controller 11 notifies the master controller 31 of the setting state of each of the radio wave sensors 22. An instruction to set each of the radio wave sensors 22 to the motion detection state or the sleep state may be issued from the master controller 31 to the slave controller 21 based on a notification from the slave controller 11.

The slave controller 21 sets each of the radio wave sensors 22 to the motion detection state or the sleep state based on the instruction from the slave controller 11. Then, the radio wave sensors 12 and 22 to be used for detecting the gesture are determined, and the process illustrated in FIG. 22 ends. In this example, among the three radio wave sensors 22 (221, 222, and 223) of the radar 20E, zero, one, or two radio wave sensors 22 are set to the motion detection state in accordance with the direction of the radar 20E.

The slave controller 11 may issue an instruction to set the radio wave sensor 22 corresponding to the radio wave whose received intensity is the highest to the motion detection state and set the other radio wave sensors 22 to the sleep state (i.e., the low power consumption state), to the slave controller 21 of the radar 20E. In this case, one of the three radio wave sensors 22 is set to the motion detection state. However, when the received intensity of the radio wave transmitted from the two radio wave sensors 22 is the same, that is, when there are two radio wave sensors 22 corresponding to the radio wave whose received intensity is the highest, the two radio wave sensors 22 are set to the motion detection state.

Subsequently, the motion detection system 100E detects a gesture, such as a gesture by the finger, using two radars 10 and 20E, as in FIG. 11. When the gesture is detected using the radio wave sensor 12 of the radar 10 and the two radio wave sensors 22 of the radar 20E, the average values ΔVb, ΔDb, and ΔEb illustrated in FIG. 11 are average values of values detected by the two radio wave sensors 22.

The radar 10 may not be able to receive the radio wave transmitted by each of the radio wave sensors 221, 222, and 223 because the person P puts the left hand in a pocket, for example. In this case, all the radio wave sensors 221, 222, and 223 are set to the low power consumption state (e.g., the sleep state), and the gesture is detected using only the radio wave sensor 12 of the radar 10. The motion detection system 100E detects the gesture, such as a gesture by the finger, using only the radio wave sensor 12 of the radar 10 as in FIG. 12.

In the embodiment, by using the radars 20E that can irradiate the radio waves in all directions around the belt B, it is possible to detect the motion of the finger or the like along with the radar 10 even when the direction or the angle of the arm to which the radar 20E is attached is out of a desired direction or angle, such as twisting the arm. That is, compared with the radar 20 on which one radio wave sensor 22 is mounted, the probability that multiple radars 10 and 20E can be used for detecting the motion of the finger or the like can be increased, and the accuracy of the motion detection can be improved.

Figure 23:
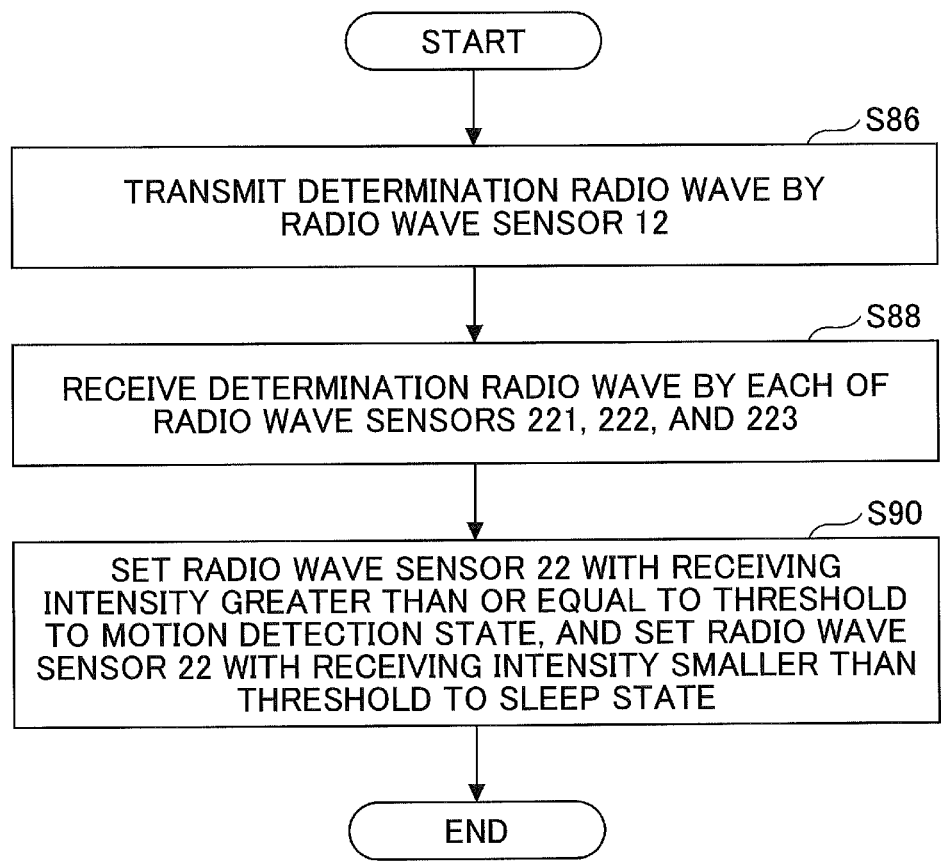
FIG. 23 is a flowchart illustrating another operation example of determining a radio wave sensor to be used for detecting a gesture in the motion detection system of FIG. 21.

FIG. 23 illustrates another operation example of determining the radio wave sensor 22 to be used for detecting the gesture in the motion detection system 100E of FIG. 21. That is, FIG. 23 illustrates an example of a control method of the motion detection system 100E.

The operation illustrated in FIG. 23, as in FIGS. 4 and 22, is started by the gesturing person P (FIG. 1) operating the mobile terminal 30 and launching the motion detection system 100E before gesturing. However, in FIG. 23, the master controller 31 causes the radar 10 to transmit the determination radio wave upon the start of the motion detection system 100E, and causes the radar 20E to receive the determination radio wave. In FIG. 23, the radar 10 is hung at the chest and the radar 20E is attached to the left wrist by the belt B.

First, in step S86, the radio wave sensor 12 of the radar 10 transmits the determination radio wave. In step S88, each of the radio wave sensors 221, 222, and 223 of the radar 20E receives the determination radio wave transmitted by the radio wave sensor 12 and stores the received intensity. In step S90, the slave controller 21 of the radar 20E sets each of the radio wave sensors 22 whose received intensity is greater than or equal to a predetermined threshold value, to the motion detection state, and sets each of the radio wave sensors 22 whose received intensity is smaller than the predetermined threshold value to the sleep state (i.e., the low power consumption state). The slave controller 21 notifies the master controller 31 of the setting state of the radio wave sensor 22. Then, the radio wave sensors 12 and 22 to be used for detecting the gesture are determined, and the process illustrated in FIG. 23 ends. Subsequent gesture detection operations are similar to the operations described in FIG. 22.

The slave controller 21 may set the radio wave sensor 22 whose received intensity is the highest to the motion detection state and set the other radio wave sensors 22 to the sleep state (i.e., the low power consumption state). In this case, one of the three radio wave sensors 22 is set to the motion detection state. However, when the received intensity of the radio waves of two radio wave sensors 22 is the same, that is, when there are two radio wave sensors 22 whose received intensity is the highest, two radio wave sensors 22 are set to the motion detection state.

Figure 24:
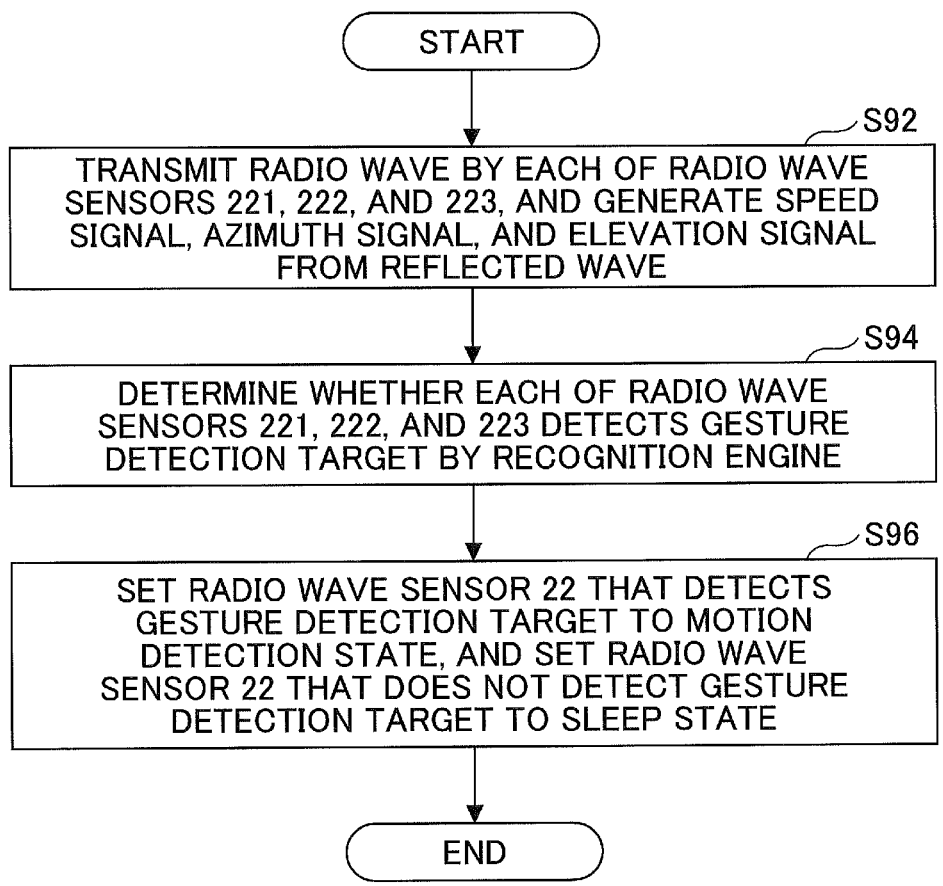
FIG. 24 is a flowchart illustrating yet another operation example of determining a radio wave sensor to be used for detecting a gesture in the motion detection system of FIG. 21.

FIG. 24 illustrates a yet another operation example of determining the radio wave sensor 22 to be used for detecting the gesture in the motion detection system 100E of FIG. 21. That is, FIG. 24 illustrates an example of a control method of the motion detection system 100E.

The operation illustrated in FIG. 24, as in FIG. 4 and FIG. 22, is started by the gesturing person P (FIG. 1) operating the mobile terminal 30 and launching the motion detection system 100E before gesturing. As illustrated in FIG. 19, the following description assumes that the radar 20E is attached to the left wrist by the belt B.

First, in step S92, the radar 20E operates each of the radio wave sensors 221, 222, and 223 to transmit the radio wave for detecting a motion of the object. Each of the radio wave sensors 221, 222, and 223 generates the speed signal (or the distance signal), the azimuth signal, and the elevation signal based on the received radio wave (i.e., the reflected wave). The speed signal (or the distance signal), the azimuth signal, and the elevation signal, which are generated, are transferred to the recognition engine 32 through the master controller 31.

Next, in step S94, the recognition engine 32 determines whether each of the radio wave sensors 221, 222, and 223 has detected an object of the gesture detection target based on the speed signal (or the distance signal), the azimuth angle signal, and the elevation angle signal transferred from the radar 20E. In this example, the object of the gesture detection target is the index finger of the right hand.

Next, in step S96, the master controller 31 issues an instruction to set each of the radio wave sensors that has detected the object to be detected to the motion detection state, to the slave controller 21 of the radar 20E. The master controller 31 issues an instruction to set the other radio wave sensors 22 that do not detect the object to be detected to the sleep state (i.e., the low power consumption state), to the slave controller 21 of the radar 20E. The slave controller 21 sets each of the radio wave sensors 22 to the motion detection state or the sleep state based on the instruction from the master controller 31. Then, the radio wave sensors 12 and 22 to be used for detecting the gesture are determined, and the process illustrated in FIG. 24 ends.

When the radar 20E has a function of recognizing the shape of the object of the gesture detection target based on the speed signal (or the distance signal), the azimuthal signal, and the elevation signal, the radar 20E itself may perform the determination of step S94. For example, when the radar 20E includes the recognition engine 32, the radar 20E can recognize the shape of the object of the gesture detection target. The slave controller 21 may also have the function of recognizing the shape of the object of the gesture detection target based on the speed signal (or the distance signal), the azimuthal signal, and the elevation signal. In this case, in step S96, the slave controller 21 sets each of the radio wave sensors 22 to the motion detection state or the sleep state without receiving the instruction from the master controller 31.

The process illustrated in FIG. 22 or FIG. 23 may be combined with the process illustrated in FIG. 24. That is, the motion detection state may be set to the radio wave sensor 22 that satisfies the determinations of both FIG. 22 and FIG. 24 or both FIG. 23 and FIG. 24, and the other radio wave sensors 22 may be set to the sleep state. When there are two radio wave sensors 22 that are set to the operation detection state in FIG. 22 or 23, one radio wave sensor 22 to be used may be determined through the process illustrated in FIG. 24. By selecting and using only one among the two radio wave sensors 22 that can be used, the gesture can be recognized by the process illustrated in FIG. 11. With respect to the above, when two radio wave sensors 22 are used, a process of the recognition engine 32 becomes complicated because the process requires a more complicated process than the process illustrated in FIG. 11, such as calculating an average value of data of the multiple radio wave sensors.

Figure 25:
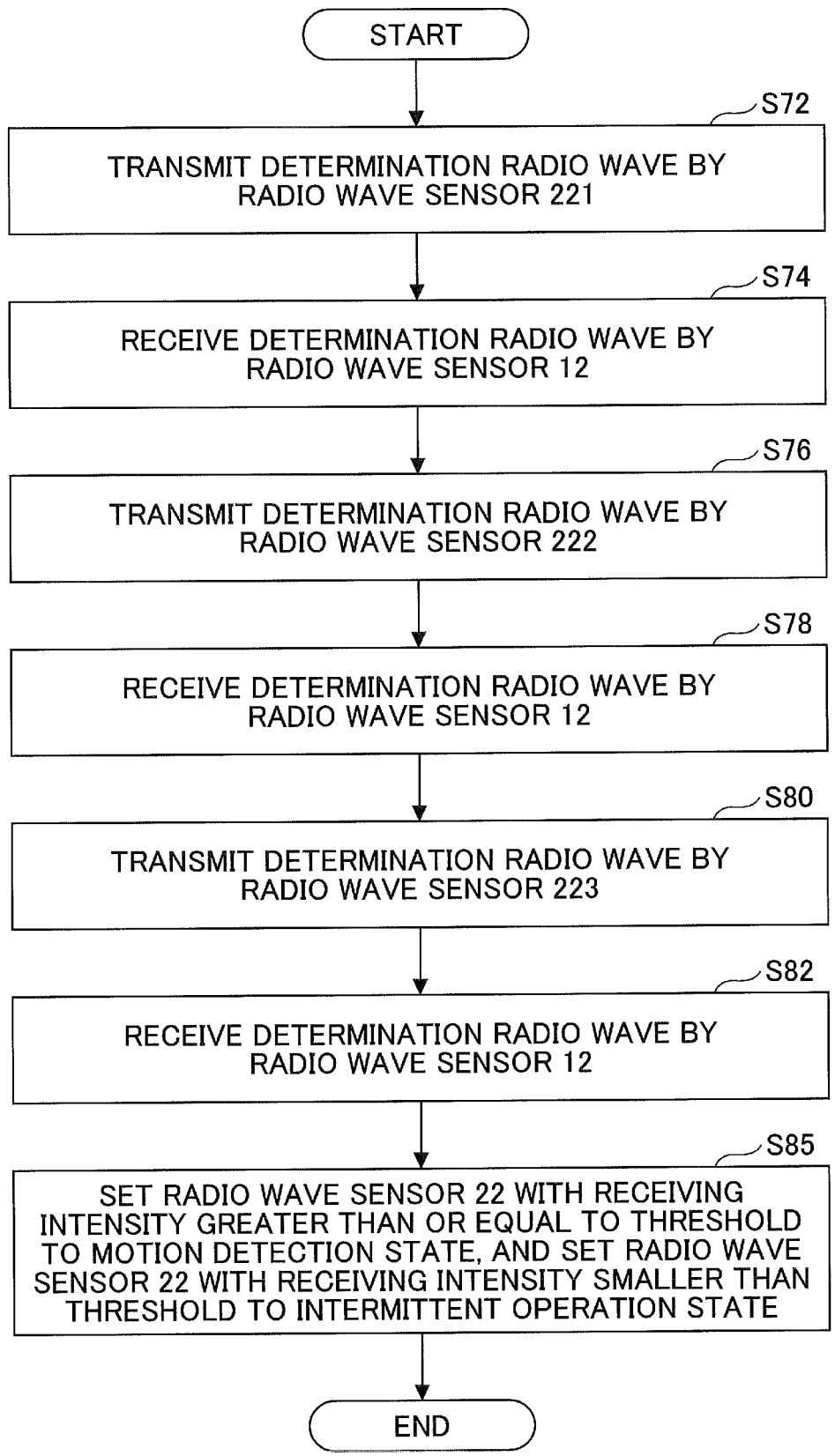
FIG. 25 is a flowchart illustrating another operation example of determining a radio wave sensor to be used for detecting a gesture in the motion detection system of FIG. 21.

FIG. 25 illustrates another operation example of determining the radio wave sensor 22 to be used for detecting the gesture in the motion detection system 100E of FIG. 21. Operations similar to the operations in FIG. 22 are referenced by the same reference numerals and the detailed descriptions are omitted. FIG. 25 is similar to FIG. 22 except that step S85 is performed instead of step S84 of FIG. 22.

After step S82, in step S85, the slave controller 11 of the radar 10 issues an instruction to set the radio wave sensor 22 corresponding to the radio wave whose received intensity is greater than or equal to a predetermined threshold to the motion detection state, to the slave controller 21 of the radar 20E. The slave controller 11 also issues an instruction to set the other radio wave sensors 22 whose received intensity is smaller than the predetermined threshold to the intermittent operation state (i.e., the intermittent operation mode, or the low power consumption state), to the slave controller 21 of the radar 20E.

The slave controller 21 sets each of the radio wave sensors 22 to the motion detection state or the intermittent operation state based on instruction from the slave controller 11. Then, the radio wave sensors 12 and 22 to be used for detecting the gesture are determined, and the process illustrated in FIG. 25 ends. The slave controller 11 may issue an instruction to set the radio wave sensor 22 corresponding to the radio wave whose received intensity is the highest to the motion detection state and set the other radio wave sensors 22 to the intermittent operation state, to the slave controller 21 of the radar 20E. In step S90 of FIG. 23, the motion detection system 100E may be set to the intermittent operation state instead of the sleep state.

In the intermittent operation state, for example, an operation in which after the operation detection state continues for 1 ms, the sleep state continues for 9 ms, is repeated. That is, in the intermittent operation state, the radio wave sensor 22 intermittently detects the object. This can reduce the power consumption of the radar 20E compared with the power consumption required when the motion detection state always continues. During the time duration of the motion detection state in the intermittent operation state, the radio wave sensor 22 detects the motion of the object of the motion detection target (for example, the index finger of the right hand). When the motion is detected, the radio wave sensor 22 may be switched from the intermittent operation state to the motion detection state.

Figure 26:
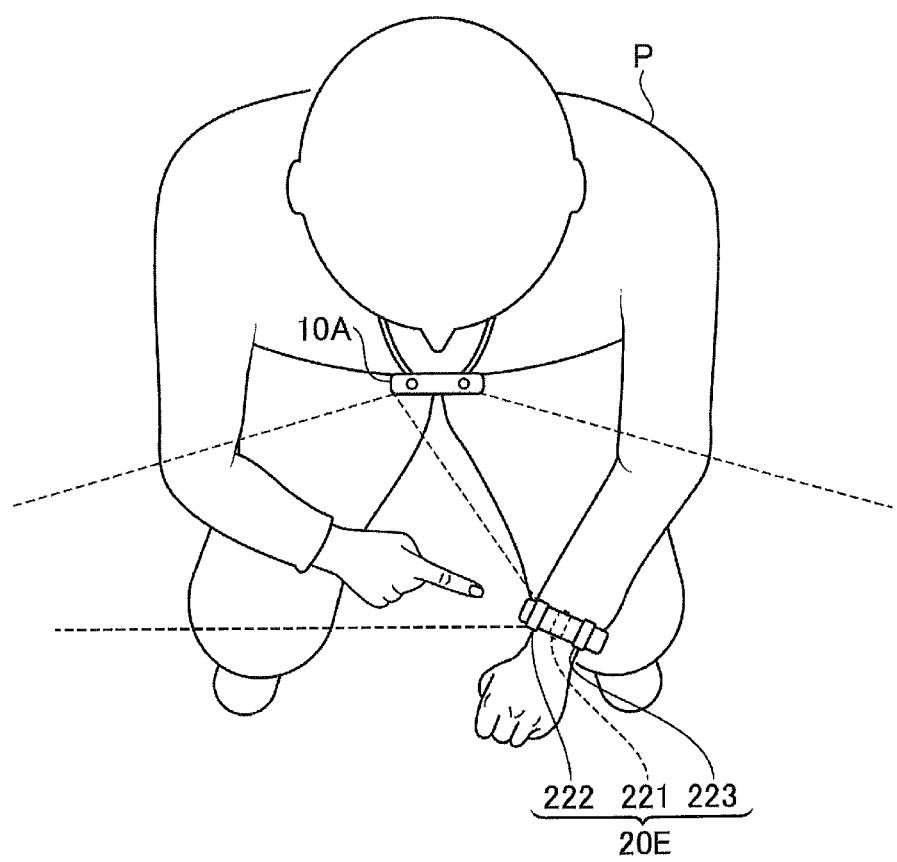
FIG. 26 is an explanatory drawing illustrating an operation example of detecting a gesture after the radio wave sensor for detecting the gesture has been determined in FIG. 25.

FIG. 26 illustrates an example of the gesture detection operation after the radio wave sensors 12 and 22 to be used for detecting the gesture in FIG. 25 have been determined. In FIG. 26, the person P places the left arm to which the radio wave sensor 22 is attached, on the knee with the palm side facing down. Before the condition illustrated in FIG. 26, as illustrated in FIG. 19, the process illustrated in FIG. 25 is performed with the left forearm being extended horizontally, and the radio wave sensors 12 and 22 to be used for detecting the gesture are determined.

The radio wave sensor 221, which is located on the palm side of the left hand, is set to the motion detection state, and the radio wave sensors 222 and 223, which are located at positions corresponding to the index finger and the medicinal finger on the back side of the left hand, are set to the intermittent operation state, for example. Subsequently, the person P horizontally extends his/her left forearm and gestures with his/her right index finger for a while, as illustrated in FIG. 19.

Then, as illustrated in FIG. 26, the person P is seated in a chair or the like and places the left hand on the knee. In this state, the radio wave sensor 221 in the motion detection state faces the knee and cannot detect the gesture of the right hand index finger. With respect to this, the radio wave sensor 222 in the intermittent operation state can detect the gesture of the right hand index finger when the radio wave sensor 222 is temporarily switched to the operation detection state.

For example, when the radio wave sensor 222 detects the shape of the right hand index finger, the radio wave sensor 222 is switched from the intermittent operation state to the motion detection state, and starts detecting the gesture of the right hand index finger. Switching between operation states may be performed by the slave controller 21 of the radar 20E or by the master controller 31 of the mobile terminal 30.

This enables another radio wave sensor 222 in the intermittent operation state to detect the gesture even when the position or direction of the radar 20E is changed by a motion such as twisting the arm, and even when the gesture cannot be detected by the radio wave sensor 221 in the motion detection state.

As described above, in this embodiment, as in the first embodiment, the radio wave sensor 22 of the radar 20E that does not contribute to detecting the motion of the object to be detected can be set to the low power consumption state (e.g., the sleep state or the intermittent operation state). Thus, the power consumption of the motion detection system 100E can be suppressed. For example, the radar 20E includes three radio wave sensors 22 arranged at intervals around the belt B attached to the wrist. This enables one of the three radio wave sensors 22 to detect the gesture, such as a gesture of the finger, regardless of the position or direction of the arm or the like to which the radar 20E is attached.

For example, either the radio wave sensors 22 (221, 222, and 223) or the radio wave sensor 12 transmits the determination radio wave to the other radio wave sensor, and it is determined whether each radio wave sensor 22 is at a position (or a direction) in which a motion of the object to be detected can be detected based on the received intensity of the determination radio wave. Alternatively, it is determined whether each radio wave sensor 22 is at a position in which the motion of the object to be detected can be detected by detecting a part of the gesture detection target, such as the finger, based on the radio wave transmitted by each of the three radio wave sensors 22. Thus, it is possible to determine whether each of the radio wave sensors 22 is set to the intermittent operation state based on the relative positional relationship between the radars 10 and 20E that detect the motion of the object to be detected.

The intermittent operation state is used for the low power consumption state of the radio wave sensor 22, so that the radio wave sensor 22 in the intermittent operation state can be quickly switched to the motion detection state to detect the gesture, when the position or direction of the part, such as the arm, to which the radar 20E is attached, is changed.

Furthermore, depending on whether each of the three radio wave sensors 22 detects the motion of the object to be detected, such as the finger, each radio wave sensor 22 can be set to the motion detection state or the low power consumption state (e.g., the sleep state or the intermittent operation state).

Third Embodiment

Figure 27:
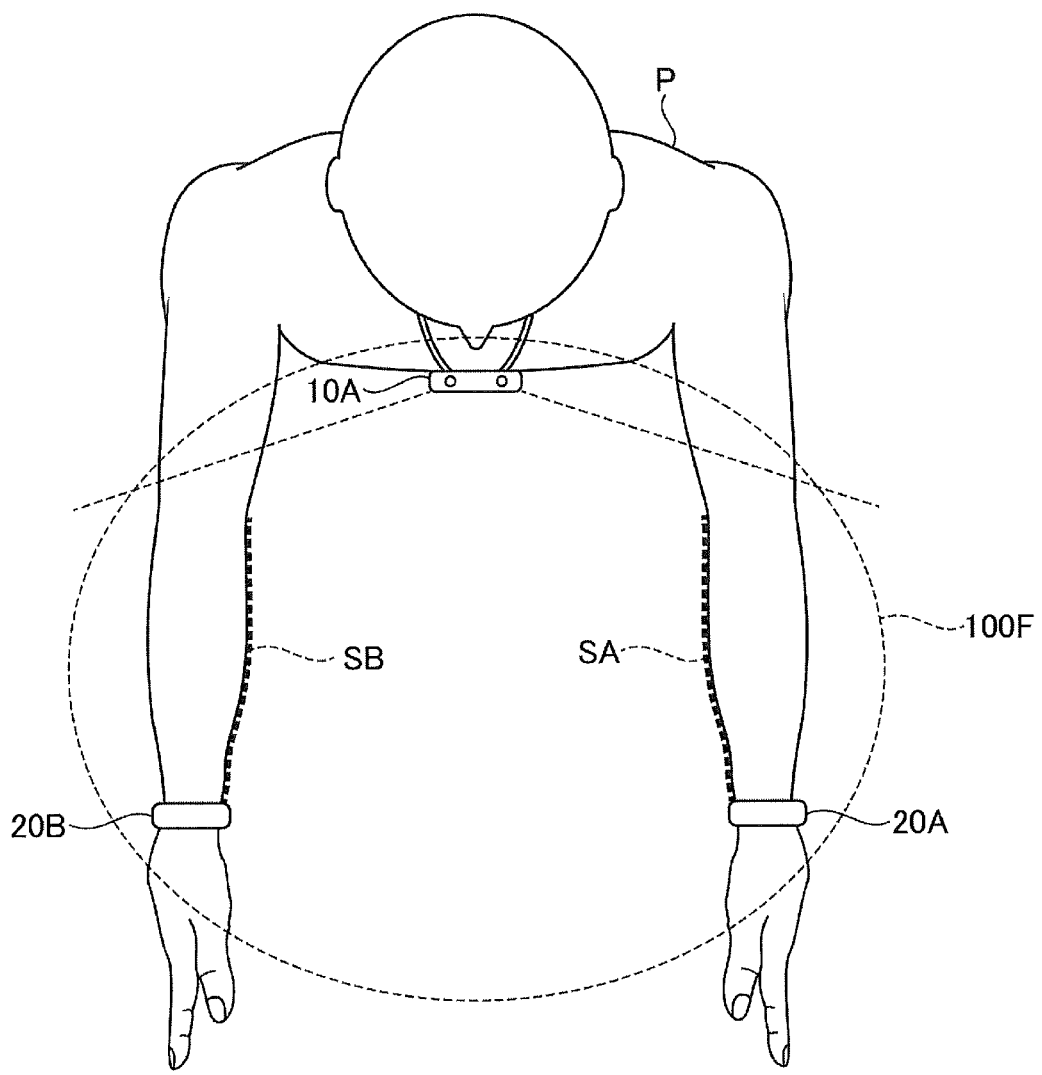
FIG. 27 is an explanatory drawing illustrating an overview of a motion detection system according to a third embodiment.

FIG. 27 illustrates an overview of a motion detection system 100F according to a third embodiment. Elements similar to the elements of FIG. 15 are referenced by the same reference numerals, and the detailed descriptions are omitted. The motion detection system 100F includes, for example, the radar 10A arranged at the chest of the person P and the radars 20A and 20B attached to the left and right wrists of the person P, respectively. The configuration of the motion detection system 100F is similar to the configuration of the motion detection system 100B illustrated in FIG. 15 or the motion detection system 100C illustrated in FIG. 17.

In the motion detection system 100F, as in FIG. 6, the determination radio wave is transmitted from the radar 10A to determine whether each of the radar 20A and 20B is used based on whether a shape representing the body part to which each of the radars 20A and 20B is attached, is detected at a predetermined position.

When a result detected by the radar 10A indicates that a shape SA representing the left forearm horizontally extends toward the front of the radar 10A (i.e., the front of the body), the master controller 31 determines that the gesture can be detected using the radar 20A. Similarly, when a result detected by the radar 10A indicates that a shape SB representing the right forearm horizontally extends toward the front of the radar 10B, the master controller 31 determines that the gesture can be detected using the radar 20B.

Figure 28:
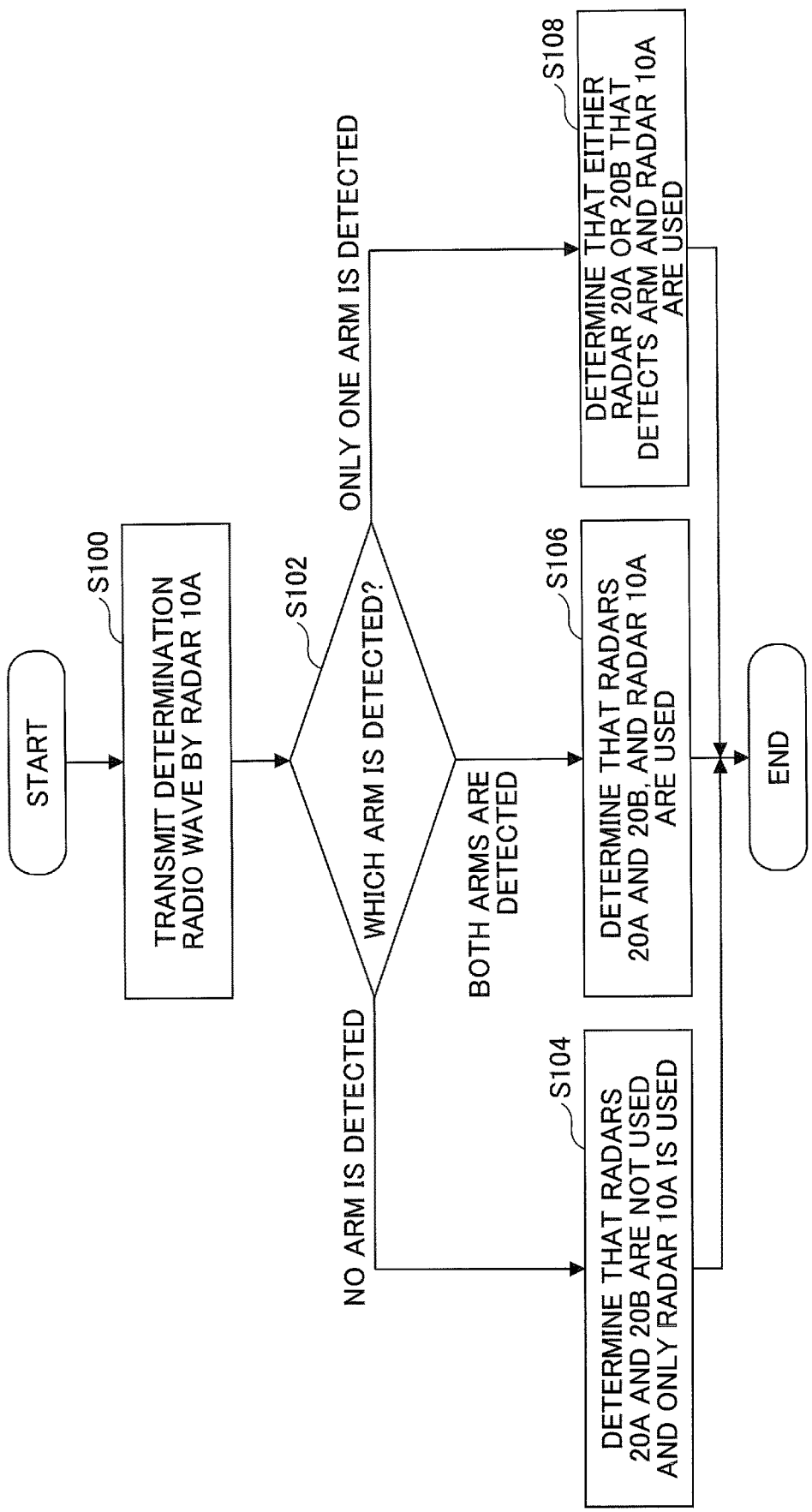
FIG. 28 is a flowchart illustrating an operation example of determining a radio module to be used for detecting a gesture in the motion detection system of FIG. 27.

FIG. 28 illustrates an operation example of determining the radar modules 20A and 20B to be used for detecting the gesture in the motion detection system 100F of FIG. 27. That is, FIG. 28 illustrates an example of a control method of the motion detection system 100F.

The operation illustrated in FIG. 28 is started by the gesturing person P (see FIG. 27) launching the motion detection system 100F. In a manner similar to the motion detection system 100B illustrated in FIG. 15, when the motion detection system 100F includes a radar 10E including the recognition engine 32, the operation illustrated in FIG. 28 is started by the person P operating a touch panel or the like of the radar 10A.

First, in step S100, the radar 10A transmits the determination radio wave from the radio wave sensor 12. The slave controller 11 of the radar 10A transfers a signal indicating the reflected wave received by the radio wave sensor 12 to the recognition engine 32 through the master controller 31.

Next, in step S102, the recognition engine 32 determines which arm the radio wave sensor 12 has detected based on the signal indicating the reflected wave received by the radio wave sensor 12 and notifies the master controller 31 of a determined result. The master controller 31 performs step S104 when the determined result indicates that no arm is detected, performs step S106 when the determined result indicates that both forearms are detected, and performs step S108 when the determined result indicates that only one forearm is detected.

In step S104, the master controller 31 determines to use only the radar 10A to detect the gesture without using the radars 20A and 20B. The master controller 31 issues an instruction to set the radio wave sensor 22A to the sleep state, to the slave controller 21A, issues an instruction to set the radio wave sensor 22B to the sleep state, to the slave controller 21B, and terminates the process illustrated in FIG. 28. The slave controller 21A sets the radio wave sensor 22A to the sleep state based on the instruction from the master controller 31. The slave controller 21B sets the radio wave sensor 22B to the sleep state based on the instruction from the master controller 31.

In step S106, the master controller 31 determines to detect the gesture using radars 20A, 20B, and 10A. The master controller 31 issues an instruction to set the radio wave sensor 22A to the motion detection state, to the slave controller 21A, issues an instruction to set the radio wave sensor 22B to the motion detection state, to the slave controller 21B, and terminates the process illustrated in FIG. 28. The slave controller 21A sets the radio wave sensor 22A to the motion detection state based on the instruction from the master controller 31. The slave controller 21B sets the radio wave sensor 22B to the motion detection state based on the instruction from the master controller 31.

In step S108, the master controller 31 determines to detect the gesture using the radars 10A and 20A or the radars 10A and 20B. When the left forearm is detected, the master controller 31 issues an instruction to set the radio wave sensor 22A to the motion detection state, to the slave controller 21A, and issues an instruction to set the radio wave sensor 22B to the sleep state, to the slave controller 21B.

The slave controller 21A sets the radio wave sensor 22A to the motion detection state based on the instruction from the master controller 31. The slave controller 21B sets the radio wave sensor 22B to the sleep state based on the instruction from the master controller 31.

When the right forearm is detected, the master controller 31 issues an instruction to set the radio wave sensor 22A to the sleep state, to the slave controller 21A, and the slave controller 21B issues an instruction to set the radio wave sensor 22B to the motion detection state, to the slave controller 21B. Then, the process illustrated in FIG. 28 ends. The slave controller 21A sets the radio wave sensor 22A to the sleep state based on the instruction from the master controller 31. The slave controller 21B sets the radio wave sensor 22B to the motion detection state based on the instruction from the master controller 31. Then, the process illustrated in FIG. 28 ends.

As in the embodiments described above, in this embodiment, the radio wave sensors 22A and 22B that do not contribute to detecting the motion of the object to be detected can be set to the low power consumption state (e.g., the sleep state), and the power consumption of the motion detection system 100F can be suppressed. The radar 10A detects that the shape representing the body part to which each of the radars 20A and 20B are attached is at the predetermined position, so that the radars 10A, 20A, and 20B to be used for detecting the gesture can be determined without transmitting the radio waves to the radar 20A and 20B or receiving the radio waves from the radar 20A and 20B.

Fourth Embodiment

Figure 29:
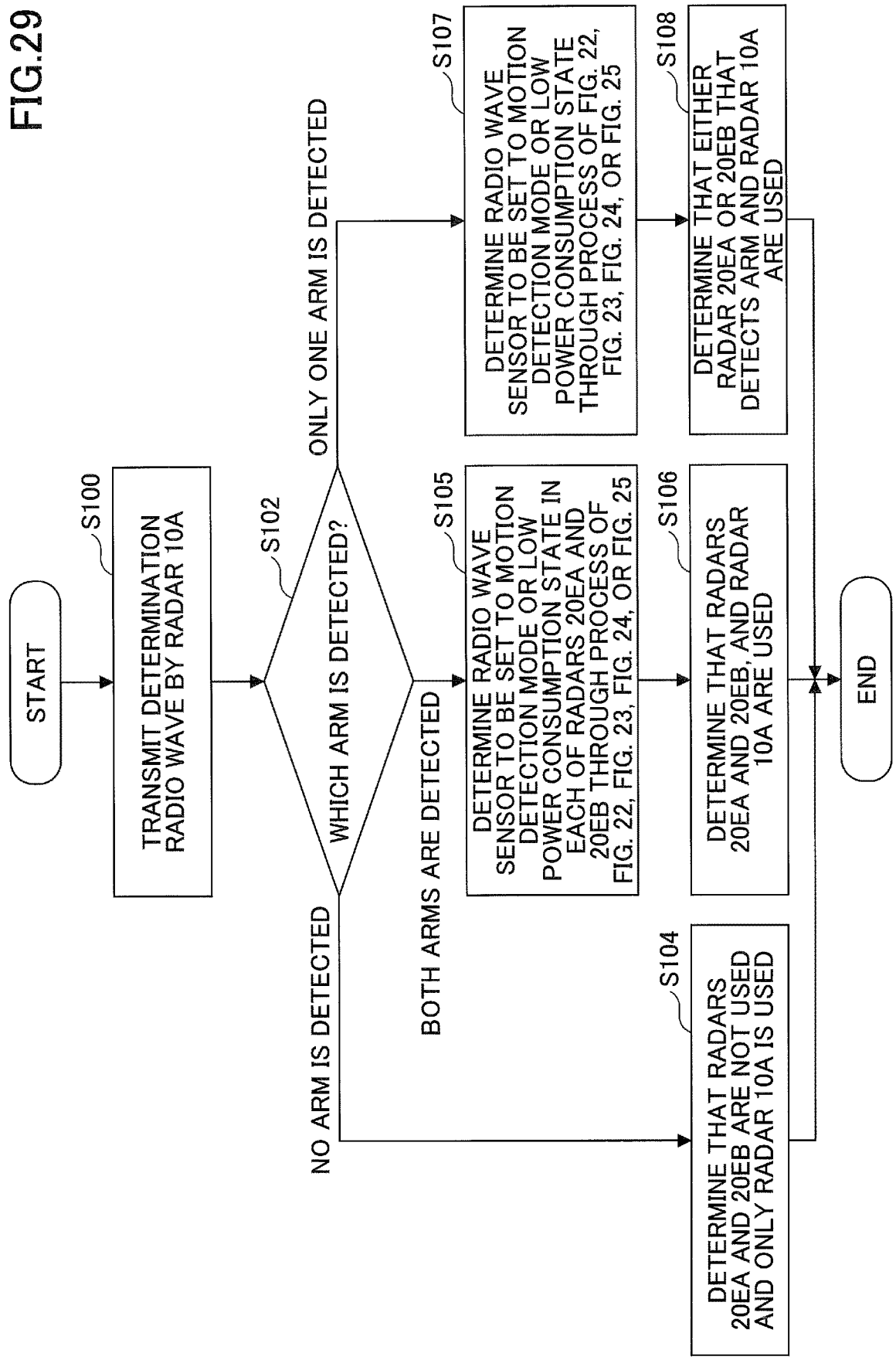
FIG. 29 is a flowchart illustrating an operation example of determining a radio module to be used for detecting a gesture in a motion detection system according to a fourth embodiment.

FIG. 29 illustrates an operation example of determining radar modules 10A, 20EA, and 20EB to be used for detecting the gesture in the motion detection system 100G of a fourth embodiment. That is, FIG. 29 illustrates an example of a control method of the motion detection system 100G. Operations similar to the operations of FIG. 28 are referenced by the same reference numerals and the detailed descriptions are omitted.

The motion detection system 100G that performs the process illustrated in FIG. 29 includes two radars 20E each including three radio wave sensors 22 (221, 222, and 223) illustrated in FIG. 19 instead of the radars 20A and 20B in FIG. 27. That is, in this embodiment, the radars 20E are attached to the left wrist and right wrist of the person P. For clarification of the description, hereinafter the radar 20E attached to the left wrist is referred to as the radar 20EA, and the radar 20E attached to the right wrist is referred to as the radar 20EB.

In the process illustrated in FIG. 29, the motion detection system 100G performs step S105 between step S102 and step S106 of FIG. 28, and performs step S107 between step S102 and step S108.

When both forearms are detected in step S102, in step S105, the motion detection system 100G performs the process illustrated in FIG. 22, 23, 24, or 25. The motion detection system 100G determines the radio wave sensor 22 to be set to the motion detection state and the radio wave sensor 22 to be set to the low power consumption state (e.g., the sleep state or the intermittent operation state) in each of the radar 20EA and 20EB. In step S106, the motion detection system 100G determines to detect the gesture using the radio wave sensors 22 of the radars 20EA and 20EB that are determined to be set to the motion detection state in step S105 and the radar 10E. The radars 20EA and 20EB set each of the three radio wave sensors 22 to the motion detection state or the low power consumption state based on the determination in step S105.

When only one forearm is detected in step S102, in step S107, the motion detection system 100G performs the process illustrated in FIG. 22, 23, 24, or 25. The motion detection system 100G determines each of the radio wave sensors 22 to be set to the motion detection state or the low power consuming state (e.g., the sleep state or the intermittent operation state) in the radar 20EA or the radar 20EB attached to the wrist of the detected forearm. Subsequently, in step S108, the motion detection system 100G determines to detect the gesture using each of the radio wave sensors 22 of the radar 20EA or the radar 20EB that is determined to be set to the motion detection state in step S107 and the radar 10E. The radar 20EA or the radar 20EB sets each of the three radio wave sensors 22 to the motion detection state or the low power consumption state based on the determination in step S107.

As in the embodiment described above, in this embodiment, the radio wave sensors 22A and 22B that do not contribute to detecting a motion of the object to be detected can be set to the low power consumption state, and the power consumption of the motion detection system 100G can be suppressed. As in the second embodiment, the gesture, such as a gesture of the finger, can be detected by one of the three radio wave sensors 22 regardless of the position or direction of the arm or the like to which the radar 20EA and the radar 20EB are attached.

At this time, for example, it is possible to determine whether each of the radio wave sensors 22 is set to the intermittent operation state based on the relative positional relationship of the radars 10 and 20EA that detect the motion of the object to be detected and the relative positional relationship of the radars 10 and 20EB that detect the motion of the object to be detected. Thus, when the positions or directions of the parts to which the radars 20EA and 20EB are attached, such as arms, are changed, the radio wave sensor 22 in the intermittent operation state can be quickly switched to the motion detection state to detect the gesture.

Further, the radar 10A detects that the shape representing the body part to which each of the radars 20A and 20B is attached, is located at a predetermined position, so that it is possible to determine the radars 10A and 20B to be used for detecting the gesture without transmitting the radio waves to the radars 20A and 20B or receiving the radio waves from the radars 20A and 20B.

Fifth Embodiment

FIG. 30 illustrates an example of a method of causing the recognition engine 32 to function as a classifier by machine learning in a fifth embodiment. The mobile terminal 30 is included in the motion detection system 100 of FIG. 2, for example. The mobile terminal 30 may be included in the motion detection system 100C illustrated in FIG. 17, the motion detection system 100E illustrated in FIG. 21, the motion detection system 100F illustrated in FIG. 27, or the motion detection system 100G illustrated in FIG. 28. The master controller 31, the recognition engine 32, and the wireless communication unit 33 may be included in the radar module 10A illustrated in FIGS. 14 and 15 and may be included in the external device 30D illustrated in FIG. 18 instead of the mobile terminal 30.

For machine learning, many pairs of IQ signals (i.e., training data) generated by the radio wave sensors 12 and 22 when the right hand index finger is moved and supervised data (i.e., correct data) representing the gesture of the right hand index finger, are first input to a training unit 302. For example, many pairs of IQ signals generated when the right hand index finger is waved in the left and right direction, in the front and rear direction, and in the up and down direction with respect to the front of the person P and correct data representing gestures, such as a gesture in the left and right direction, a gesture in the front and rear direction, and a gesture in the up and down direction, are input to the training unit 302. Training (i.e., learning) is then performed to obtain supervised data (i.e., correct answers) from the training data and parameters used for calculation are optimized in the training unit 302. The parameters may be optimized using a deep learning method.

The training unit 302 may be a neural network (one example of a machine learning model) implemented in a computer device 300, such as a server, or a machine learning model other than the neural network, for example.

As described in FIG. 6, when there are an operation mode in which both the radars 10 and 20 are used to detect the gesture and an operation mode in which only the radar 10 is used to detect the gesture, the training unit 302 may be provided for each operation mode. Alternatively, the analog signals processed by the analog signal processing units 451 and 452 illustrated in FIG. 3 may be used as the training data instead of the IQ signals. Furthermore, instead of the IQ signals, the speed signals (or the distance signals), the azimuth signals, and the elevation signals may be used as the training data.

The recognition engine 32 can function as a classifier that identifies the gesture by constructing the recognition engine 32 with the machine learning model including the parameters optimized by the training. It may be verified using IQ signals (i.e., verification data) whether the parameters obtained by the training are optimal.

The recognition engine 32 generates a probability for each of gestures in the left and right direction, in the front and rear direction, and the up and down direction, based on the IQ signals generated by the radars 10 and 20 of the motion detection system 100, and outputs the generated probability to the master controller 31, for example. The master controller 31 determines that the gesture having the highest probability is a gesture detected by the radars 10 and 20 or the radar 10, and outputs an instruction corresponding to the determined gesture to a device or the like.

As described above, in this embodiment, the gesture can be recognized by using the machine learning model constructed by machine learning without using the determination flow illustrated in FIGS. 11 to 13. Additionally, increasing the pairs of training data and supervised data can improve the accuracy of the gesture recognition.

Here, the number of the radio wave sensors 12 mounted in the radars 10, 10B, 10D, and 10E (which will be hereinafter also referred to as the radar 10X) illustrated in the above-described embodiments is not limited to one and may be two or more. The number of the radio wave sensors 22 mounted in the radars 20, 20A, 20B, 20D, 20E (which will be hereinafter also referred to as the radar 20X) illustrated in the above-described embodiments is not limited to one or three. For example, the radar 20E may include four or more radio wave sensors 22 provided at equal intervals around the belt B.

The application of the radars 10X and 20X is not limited to the application to a wearable device attached to the person P. For example, the radars 10X and 20X may be mounted on a terminal or a device that detects the motion of an object whose positional relationship with respect to a reference point relatively varies. Alternatively, the radars 10X and 20X may be attached to multiple objects whose positional relationship relatively varies, and the radars 10X and 20X may be attached to an object and a person whose positional relationship relatively varies.

For example, the motion detection system may be constructed by the radar 10X mounted on a main body of an industrial robot and a radar 20X mounted on an arm of the industrial robot. The motion detection system may also be constructed by the radars 20 mounted to multiple arms of the industrial robot. In this case, when the radar 20X is at a position where the motion of the object to be detected cannot be detected, the radar 20X is set to the low power state (e.g., the sleep state or the intermittent operation state), and the motion of the object is detected by another radar that has been set to the motion detection state.

Alternatively, the motion detection system may be constructed by the radar 10X (or 20X) mounted on a mobile object, such as a vehicle or a drone, and the radar 20X (or 10X) attached to a person. An example of the motion detection system in this case will be described below.

The radar 10X attached to a person and the radar 20X mounted on a vehicle, such as an agricultural device, recognize a gesture of operating the vehicle and the radar 10X transmits an instruction corresponding to the recognized gesture to the vehicle. The vehicle is operated based on the instruction from the radar 10X. When the radar 20X is at a position where the gesture of the person cannot be recognized, the radar 20X is set to the low power consumption state (e.g., the sleep state or the intermittent operation state). Here, a case in which the gesture of the person cannot be recognized is a case in which the distance from the radar 20X to the person is greater than the reaching distance of the radio wave, or a case in which the radar 20X does not face the person and the radar 20X cannot receive the reflected wave from the person.

The radar 10X attached to the person and the radar 20X mounted on the drone recognize the gesture of operating the drone and the radar 10X transmits an instruction corresponding to the recognized gesture to the drone. The drone flies based on the instruction from the radar 10X. When the radar 20X is at a position where the gesture of the person cannot be recognized, the radar 20X is set to the low power consuming state (e.g., the sleep state or the intermittent operation state). This can extend the flight time of the drone.

The radar 10X attached to the person and the radar 20X mounted on a robot vacuum cleaner recognize the gesture of operating the robot vacuum cleaner, and the radar 10X transmits an instruction corresponding to the recognized gesture to the robot vacuum cleaner. The robot vacuum cleaner is operated based on the instruction from the radar 10X. When the radar 20X is at a position where the gesture of the person cannot be recognized, the radar 20X is set to the low power consumption state (e.g., the sleep state or the intermittent operation state).

In order to detect the motion of the person playing sports, the motion of the person is detected by at least one radar 10X located away from the person and the radar 20X mounted on the drone. Then, the radar 10X or the radar 20X that cannot detect the motion of the person is set to the low power consumption state (e.g., the sleep state or the intermittent operation state).

Although the invention has been described based on the embodiments, the invention is not limited to the requirements described in the above-described embodiments. According to these points, changes can be made without departing from the spirit and scope of the present invention, and can be appropriately determined in accordance with a configuration of an application.

What is claimed is:

1. A motion detection system comprising:
   a first motion detection device configured to detect a motion of an object based on a reflected wave of a radio wave transmitted by a first radio wave sensor, the first motion detection device including the first radio wave sensor; and
   a second motion detection device configured to detect the motion of the object based on a reflected wave of a radio wave transmitted by a second radio wave sensor, the second motion detection device including the second radio wave sensor;
   wherein one motion detection device among the first motion detection device and the second motion detection device transmits a determination radio wave and another motion detection device among the first motion detection device and the second motion detection device receives the determination radio wave, and
   wherein only the first motion detection device is used to detect the motion of the object when received intensity of the received determination radio wave is smaller than a predetermined threshold.

2. The motion detection system as claimed in claim 1, wherein the first motion detection device and the second motion detection device are used to detect the motion of the object when the received intensity of the received determination radio wave is greater than or equal to the predetermined threshold.

3. A motion detection system comprising:
   a first motion detection device configured to detect a motion of an object based on a reflected wave of a radio wave transmitted by a first radio wave sensor, the first motion detection device including the first radio wave sensor; and
   a second motion detection device configured to detect the motion of the object based on a reflected wave of a radio wave transmitted by a second radio wave sensor, the second motion detection device including the second radio wave sensor;
   wherein the first motion detection device transmits a radio wave to perform an operation for detecting a shape of a part to which the second motion detection device is attached,
   wherein only the first motion detection device is used to detect the motion of the object when the shape of the part has not been detected, and
   wherein the second motion detection device is set to a motion detection state in which the motion of the object is detected and the first motion detection device and the second motion detection device are used to detect the motion of the object when the shape of the part has been detected.

4. The motion detection system as claimed in claim 3, comprising
   a plurality of said second motion detection devices attached to parts different from each other,
   wherein the first motion detection device performs an operation for detecting a shape of each of the parts,
   wherein the second motion detection device corresponding to each of the parts whose shape has not been detected is set to a low power consumption state,
   wherein the second motion detection device corresponding to each of the parts whose shape has been detected is set to the motion detection state, and
   wherein the first motion detection device and each of the plurality of second motion detection devices that has been set to the motion detection state are used to detect the motion of the object.

5. The motion detection system as claimed in claim 2,
   wherein the first motion detection device includes only the first radio wave sensor,
   wherein the second motion detection device includes a plurality of said second radio wave sensors that transmit radio waves in directions different from each other,
   wherein each of the plurality of second radio wave sensors corresponding to the received intensity greater than or equal to the predetermined threshold is set to a motion detection state in which the motion of the object is detected, and each of the plurality of second radio wave sensors corresponding to the received intensity smaller than the predetermined threshold is set to a low power consumption state, and
   wherein each of the plurality of second radio wave sensors that has been set to the motion detection state is used to detect the motion of the object.

6. The motion detection system as claimed in claim 5,
   wherein the second motion detection device transmits radio waves from the plurality of second radio wave sensors to perform an operation for detecting an object of a motion detection target, and
   each of the plurality of second radio wave sensors that has not detected the object of the motion detection target is set to the low power consumption state and each of the plurality of second radio wave sensors that has detected the object of the motion detection target is set to the motion detection state.

7. The motion detection system as claimed in claim 4, wherein the low power consumption state is a sleep state in which an operation of the first radio wave sensor or the second radio wave sensor is stopped until an operation instruction is received.

8. The motion detection system as claimed in claim 4, wherein the low power consumption state is an intermittent operation state in which the first radio wave sensor or the second radio wave sensor is intermittently operated.

9. The motion detection system as claimed in claim 1, further comprising
a recognition unit configured to recognize the motion of the object based on a radio wave received by the first motion detection device or radio waves received by the first motion detection device and the second motion detection device.

10. The motion detection system as claimed in claim 9, wherein the recognition unit includes a machine learning model to which a parameter obtained by machine learning using training data and supervised data is set, the training data indicating radio waves received by the first motion detection device or radio waves received by the first motion detection device and the second motion detection device in accordance with respective motions of the object, and the supervised data indicating respective motions of the object, and
wherein data indicating a radio wave received by the first motion detection device or radio waves received by the first motion detection device and the second motion detection device is input to the machine learning model and the motion of the object is recognized based on an output from the machine learning model.

11. The motion detection system as claimed in claim 1, wherein the first motion detection device and the second motion detection device are attached to body parts different from each other to detect a gesture.

12. A motion detection device comprising:
a first radio wave sensor configured to detect a motion of an object based on a reflected wave of a transmitted radio wave; and
a controller configured to set the first radio wave sensor to a low power consumption state when received intensity of a determination radio wave is smaller than a predetermined threshold and set the first radio wave sensor to a motion detection state in which a radio wave is transmitted and received when the received intensity of the determination radio wave is greater than or equal to the predetermined threshold, the determination radio wave being transmitted from another motion detection device.

13. The motion detection device as claimed in claim 12, comprising
a plurality of said first radio wave sensors configured to transmit radio waves in directions different from each other,
wherein the controller sets each of the plurality of first radio wave sensors whose received intensity of the determination radio wave is smaller than the predetermined threshold to the low power consumption state, and sets each of the plurality of first radio wave sensors whose received intensity of the determination radio wave is greater than or equal to the predetermined threshold to the motion detection state.

* * * * *